(12) United States Patent
Shibata et al.

(10) Patent No.: US 10,012,171 B2
(45) Date of Patent: Jul. 3, 2018

(54) DIESEL ENGINE

(71) Applicant: Yanmar Co., Ltd., Osaka-shi, Osaka (JP)

(72) Inventors: Yoshiaki Shibata, Osaka (JP); Hideo Shiomi, Osaka (JP); Taichi Togashi, Osaka (JP); Hiroyuki Machiyama, Osaka (JP)

(73) Assignee: YANMAR CO., LTD., Osaka-shi, Osaka (JP)

( * ) Notice: Subject to any disclaimer, the term of this patent is extended or adjusted under 35 U.S.C. 154(b) by 147 days.

(21) Appl. No.: 14/915,166

(22) PCT Filed: Aug. 28, 2014

(86) PCT No.: PCT/JP2014/072580
§ 371 (c)(1),
(2) Date: Feb. 26, 2016

(87) PCT Pub. No.: WO2015/030117
PCT Pub. Date: Mar. 5, 2015

(65) Prior Publication Data
US 2016/0281632 A1  Sep. 29, 2016

(30) Foreign Application Priority Data

Aug. 30, 2013  (JP) ................ 2013-179898
Sep. 30, 2013  (JP) ................ 2013-204714
Mar. 18, 2014  (JP) ................ 2014-055686

(51) Int. Cl.
F02M 59/00   (2006.01)
F02D 41/30   (2006.01)
(Continued)

(52) U.S. Cl.
CPC ....... *F02D 41/3082* (2013.01); *F02D 41/062* (2013.01); *F02D 41/408* (2013.01);
(Continued)

(58) Field of Classification Search
CPC .... F02M 63/00; F02M 41/063; F02M 59/447; F02M 59/42; F02D 41/062;
(Continued)

(56) References Cited

U.S. PATENT DOCUMENTS 3,722,490 A * 3/1973 Araya .............. F01L 13/00
                                             123/179.17
4,368,709 A * 1/1983 Yasuhara ........ F02M 41/128
                                             123/502

(Continued)

FOREIGN PATENT DOCUMENTS

JP    06-43238 U    6/1994
JP    2516076 Y2   8/1996
(Continued)

*Primary Examiner* — Hai Huynh
*Assistant Examiner* — Gonzalo Laguarda
(74) *Attorney, Agent, or Firm* — Sterne, Kessler, Goldstein & Fox P.L.L.C.

(57) ABSTRACT

The application is directed to a diesel engine. If the rack cannot complete a predetermined operation within a predetermined amount of time due to the key switch being held at a start-position, the control unit controls a starter to cause a plunger to perform a preparatory stroke operation, and the stroke operation by the plunger is stopped before the diesel engine starts.

10 Claims, 34 Drawing Sheets

(51) Int. Cl.
| | |
|---|---|
| *F02D 41/06* | (2006.01) |
| *F02D 41/40* | (2006.01) |
| *F02M 59/28* | (2006.01) |
| *F02N 11/08* | (2006.01) |
| *F02M 41/06* | (2006.01) |
| *F02M 59/44* | (2006.01) |
| *F02N 19/00* | (2010.01) |
| *F02M 59/42* | (2006.01) |
| *F02D 41/22* | (2006.01) |

(52) U.S. Cl.
CPC ......... *F02M 41/063* (2013.01); *F02M 59/28* (2013.01); *F02M 59/447* (2013.01); *F02N 11/08* (2013.01); *F02D 2041/226* (2013.01); *F02M 59/42* (2013.01); *F02N 2019/002* (2013.01); *Y02T 10/44* (2013.01)

(58) Field of Classification Search
CPC ...... F02D 41/3082; F02D 41/408; F02D 1/10; F02D 1/04; F02D 200/004; F02D 2041/226; F02N 11/08; F02N 2019/002; Y02T 10/44

USPC ............... 123/357, 179.17, 339.29, 373, 364
See application file for complete search history.

(56) References Cited

U.S. PATENT DOCUMENTS

| | | | |
|---|---|---|---|
| 4,656,980 A * | 4/1987 | Ohkoshi | ................... F02D 1/10 123/179.16 |
| 4,800,861 A * | 1/1989 | Oshizawa | ............. F02D 41/009 123/179.17 |
| 9,327,706 B2 * | 5/2016 | Reed | ..................... B60W 10/06 |
| 2014/0005913 A1 * | 1/2014 | Sczomak | ............. F02D 41/062 701/112 |

FOREIGN PATENT DOCUMENTS

| | | |
|---|---|---|
| JP | 2516076 Y2 | 11/1996 |
| JP | 2964128 B2 | 8/1999 |
| JP | 2964128 B2 | 10/1999 |
| JP | 2009-197739 A | 9/2009 |
| JP | 2011-73538 A | 4/2011 |

* cited by examiner

DIESEL ENGINE

CROSS REFERENCE TO RELATED APPLICATION

This application claims the benefit of PCT Application No. PCT/JP2014/72580 filed on Aug. 28, 2014, the contents of which are herein incorporated by reference.

TECHNICAL FIELD

The present invention relates to a diesel engine.

BACKGROUND ART

Conventionally, an art of a diesel engine in which a starter is operated following operation of a key switch is known (for example, see the Patent Literature 1).

In some of the conventional diesel engines, when the key switch is operated from an OFF position to an ON position, operation inspection of a rack is performed. The operation inspection of the rack is that a predetermined operation is performed by the rack and whether the rack finishes the predetermined operation for a predetermined period of time or not is judged. As a result of the operation inspection of the rack, when the operation of the rack is judged to be abnormal, a control device of the diesel engine checks starting of the diesel engine by a starter.

As a cause of the judgment that the operation of the rack is abnormal, a problem is mentioned that a film of fuel or the like formed on an outer perimeter of a plunger, and as a result, the plunger is adhered and hardly to be rotated.

Accordingly, when the operation of the rack is judged to be abnormal and the starting of the diesel engine is checked, an operator removes manually the film of fuel or the like formed on the outer perimeter of the plunger.

However, it takes time and effort, whereby smooth starting of the diesel engine may be difficult.

PRIOR ART REFERENCE

Patent Literature

Patent Literature 1: the Japanese Patent Laid Open Gazette 2009-197739

DISCLOSURE OF INVENTION

Problems to be Solved by the Invention

The present invention provides a diesel engine which can be started smoothly even if a film of fuel or the like formed on an outer perimeter of a plunger, and as a result, the plunger is adhered and hardly to be rotated.

Means for Solving the Problems

A diesel engine described in claim 1 includes a fuel injection pump whose fuel injection amount is adjusted by moving a rack so as to change a rotation position of a plunger, an actuator operating the rack, a starter making the plunger perform stroke operation, and a control unit controlling the actuator and the starter following operation of a key switch. The control unit makes the rack perform predetermined operation by the actuator when the key switch is operated from an OFF position to an ON position, and if the rack cannot finish the predetermined operation for a predetermined period of time, on condition that the key switch is held at a START position, the control unit makes the plunger perform stroke operation by the starter and makes the plunger perform preliminary stroke operation which stops the stroke operation of the plunger before starting the diesel engine.

In a diesel engine described in claim 2, after making the plunger perform the preliminary stroke operation by the starter, the control unit makes the rack perform the predetermined operation by the actuator again.

In a diesel engine described in claim 3, when the rack cannot finish the predetermined operation for the predetermined period of time while the control unit repeats by turns the process in which the rack is made perform the predetermined operation by the actuator and the process in which the plunger is made perform the preliminary stroke operation by the starter for a predetermined number of times, the control unit checks the starting of the diesel engine by the starter.

In a diesel engine described in claim 4, the control unit releases the check of the starting of the diesel engine by the starter when the key switch is operated from the ON position to the OFF position.

A diesel engine described in claim 5 includes a notice means which notifies an operator that the control unit checks the starting of the diesel engine by the starter.

A diesel engine described in claim 6 includes a position detection device detecting a position of the rack and an output value detection device detecting an output value of the actuator. At the time at which the actuator makes the rack to perform the predetermined operation, the control unit obtains information about a detection value of the position of the rack from the position detection device and obtains information about a detection value of the output value of the actuator from the output value detection device, calculates a difference between the detection value of the position of the rack and a target position of the rack stored previously and corresponding to the output value of the actuator, and judges that the rack cannot finish the predetermined operation for the predetermined period of time when the difference is not less than a predetermined value.

Effect of the Invention

The present invention takes effect that a diesel engine can be started smoothly even if a film of fuel or the like formed on an outer perimeter of a plunger, and as a result, the plunger is adhered and hardly to be rotated.

DETAILED DESCRIPTION OF THE INVENTION

First Embodiment

Firstly, a diesel engine 1 which is a first embodiment of a diesel engine of the present invention is explained.

Figure 1:
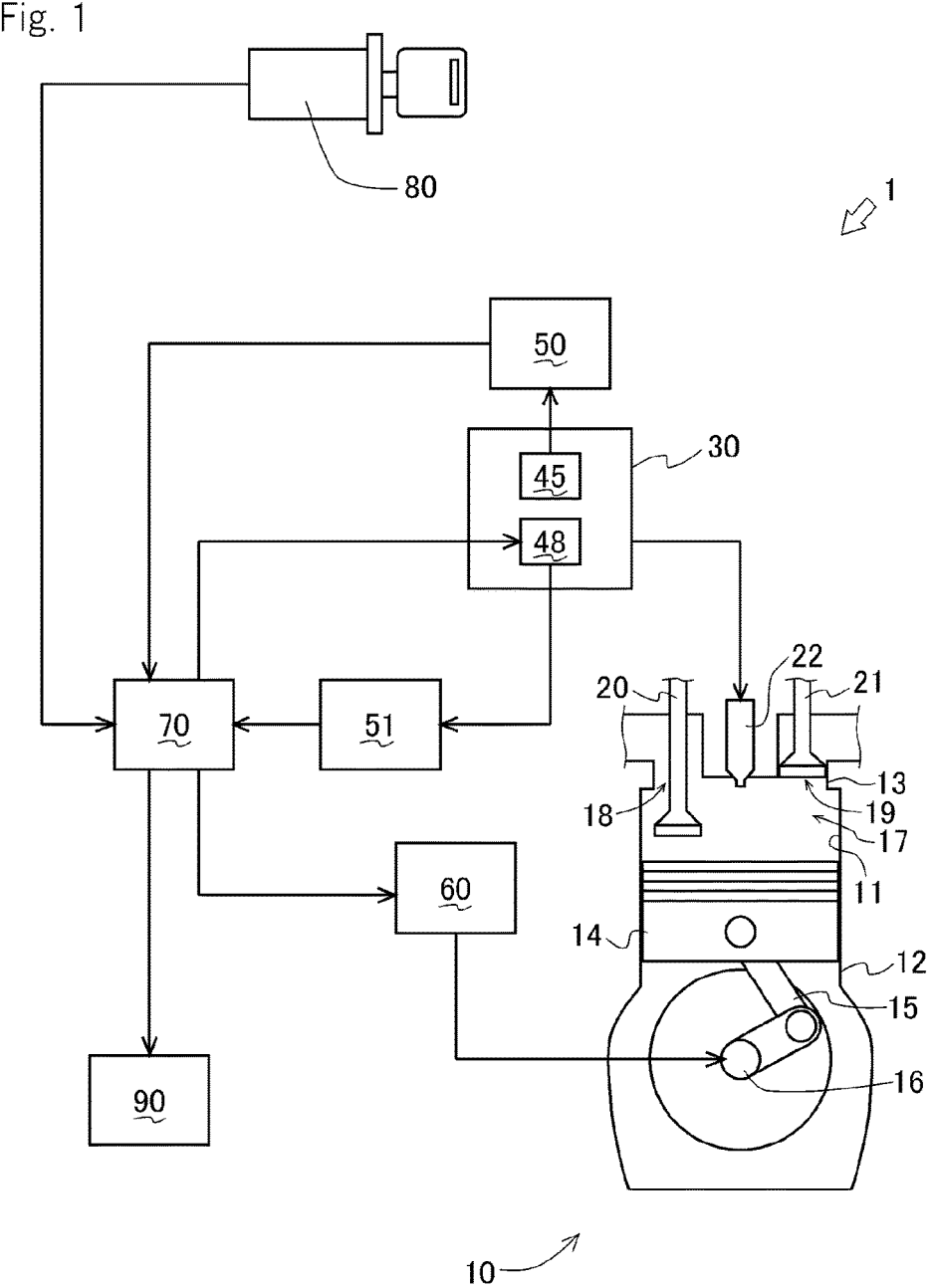
FIG. 1 is a drawing of a schematic configuration of a diesel engine of a first embodiment.

As shown in FIG. 1, the diesel engine 1 has an engine body 10, a fuel injection pump 30, a starter 60 and a control unit 70.

The engine body 10 is a main structure of the diesel engine 1.

The engine body 10 has a cylinder block 12 and a cylinder head 13 disposed at an upper end of the cylinder block 12. A plurality of cylinders 11 are provided in the cylinder block 12. A piston 14 is slidably inserted into each of the cylinders 11. A crankshaft 16 is connected via a connecting rod 15 to the piston 14. A combustion chamber 17 is formed between an upper end of the piston 14 and a lower end of the cylinder head 13. An intake port 18 and an exhaust port 19 are formed in the cylinder head 13. An intake valve 20 and an exhaust valve 21 which open and close openings at the side of the combustion chamber 17 are arranged respectively in the intake port 18 and the exhaust port 19. A fuel injection nozzle 22 is provided in the cylinder head 13 so that a tip thereof is projected into the combustion chamber 17.

The diesel engine 1 repeats an intake stroke, a compression stroke, an expansion stroke and an exhaust stroke sequentially so as to generate driving power.

In the intake stroke, the piston 14 falls to a bottom dead center while the intake port 18 is opened so as to supply outside air via the intake port 18 into the combustion chamber 17.

In the compression stroke, the piston 14 rises to a top dead center while the intake port 18 and the exhaust port 19 are closed so as to compress air in the combustion chamber 17. By this compression, temperature of the air in the combustion chamber 17 is raised. Then, near the end of the compression stroke, fuel is injected from the fuel injection nozzle 22. The fuel is ignited naturally and burnt.

In the expansion stroke, the temperature and pressure are raised suddenly by the combustion of the fuel, and the piston 14 falls to the bottom dead center.

In the exhaust stroke, the piston 14 rises to the top dead center while the exhaust port 19 is opened, and gas generated by the combustion of the fuel (exhaust gas) flows out from an inside of the combustion chamber 17 via the exhaust port 19.

The fuel injection pump 30 supplies fuel to the fuel injection nozzle 22.

Figure 2:
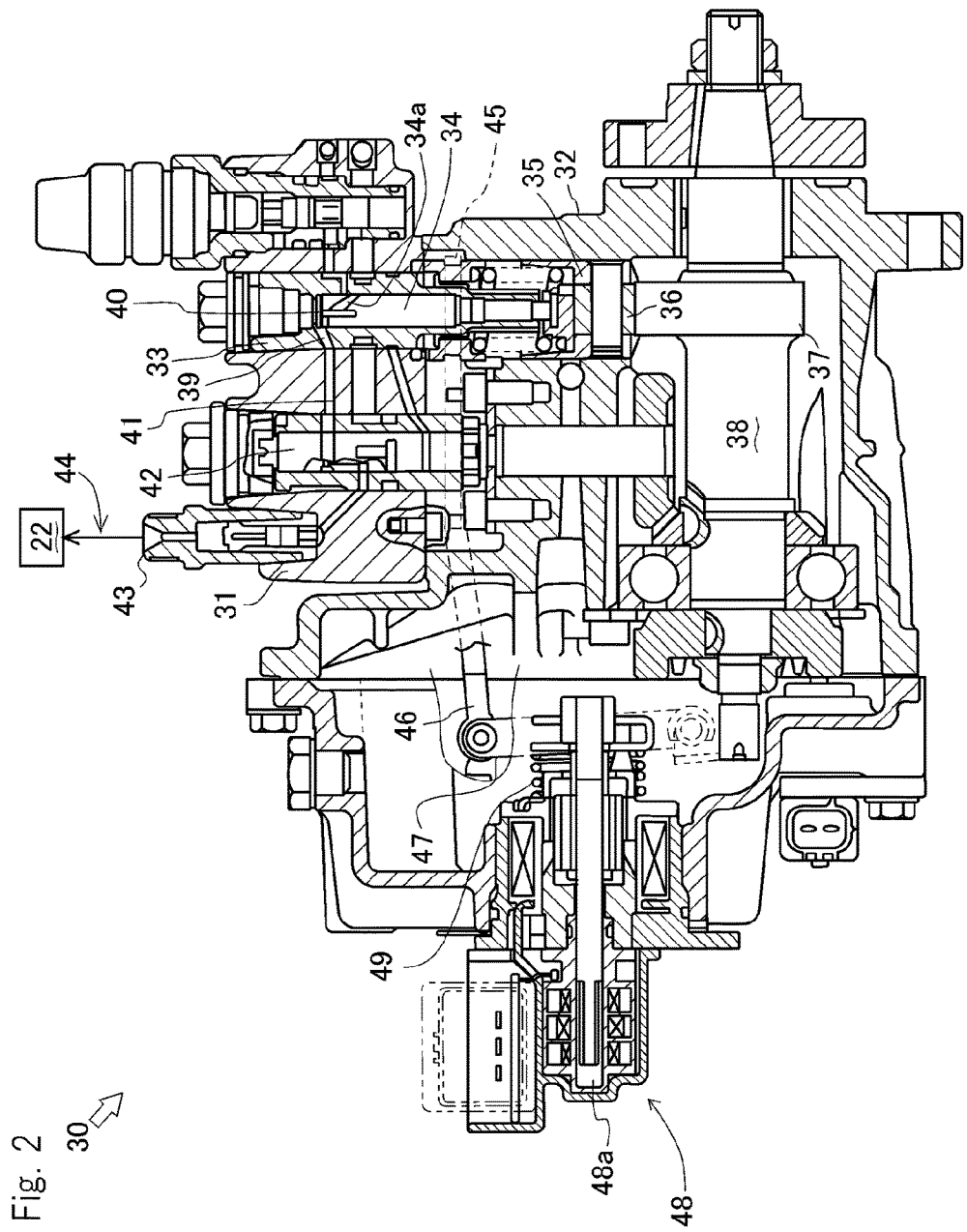
FIG. 2 is a sectional view of a fuel injection pump.

As shown in FIG. 2, the fuel injection pump 30 has a hydraulic head 31 and a pump housing 32 connected to a lower part of the hydraulic head 31. A plunger barrel 33 is inserted into the hydraulic head 31, and a plunger 34 is arranged slidably vertically in the plunger barrel 33. In an outer peripheral surface of the plunger 34, a plunger lead 34a is formed. The plunger lead 34a is a spiral groove. Below the plunger 34, a lower spring bracket 35 is arranged via a spring. At a lower end of the lower spring bracket 35, a roller-like tappet 36 is pivoted rotatably. A cam 37 contacts the tappet 36. The cam 37 is fixed to a camshaft 38. The camshaft 38 is connected via a gear (not shown) to the crankshaft 16 of the engine body 10. The camshaft 38 (the cam 37) is rotated following rotation of the crankshaft 16, and as a result, the plunger 34 is stroked vertically.

Fuel sent pressingly from a fuel supply part (not shown) is supplied to a main port 39 provided in the plunger barrel 33. When the plunger 34 moves to a lowest position in a vertical movable range (bottom dead center), a fuel pressure chamber 40 formed above the plunger 34 in the plunger barrel 33 is communicated with the main port 39, and the fuel is introduced into the fuel pressure chamber 40.

On the other hand, when the plunger 34 is pushed up by the cam 37 and raised, a communication port of the main port 39 to the fuel pressure chamber 40 is closed by an outer wall of the plunger 34.

As a result, fuel in the fuel pressure chamber 40 is sent pressingly via a distribution port 41 to a distribution shaft 42 following rising of the plunger 34. Then, the fuel sent pressingly to the distribution shaft 42 is distributed to a delivery valve 43 by the distribution shaft 42, passes through an injection pipe 44, and is injected from the fuel injection nozzle 22 of the engine body 10.

When the plunger 34 is raised further, the plunger lead 34a formed in the plunger 34 is communicated with the main port 39, and an inside of the plunger barrel 33 is communicated with the main port 39.

As a result, fuel in the plunger barrel 33 flows reversely to a side of the fuel supply part of the main port 39. Namely, fuel injection by the fuel injection pump 30 is stopped.

A gear (not shown) is formed in the outer peripheral surface of the plunger 34 and is meshed with a rack 45. The rack 45 is supported movably reciprocally by the pump housing 32. In this embodiment, the rack 45 is supported movably reciprocally between end positions P1 and P2. The rack 45 is connected via a control lever 46 and a link lever 47 to a sliding shaft 48a of an actuator (solenoid) 48. Between the sliding shaft 48a of the actuator 48 and the link lever 47, a governor spring 49 is provided. The governor spring 49 biases the rack 45 toward the end position P1 via the link lever 47. Accordingly, when the actuator 48 is not energized, the rack 45 exists at the end position P1 in the movable range P1 to P2.

By moving the sliding shaft 48a reciprocally, the actuator 48 moves the rack 45 reciprocally via the link lever 47 and the control lever 46. Following reciprocal movement of the rack 45 by the actuator 48, the plunger 34 is rotated around its axis.

By changing a rotation position of the plunger 34 by the actuator 48, timing of communication of the plunger lead 34a with the main port 39 at the time of rising of the plunger 34 is changed. As a result, fuel injection amount of the fuel injection pump 30 is changed.

A position detection device 50 detecting a position of the rack 45 is connected to the rack 45.

An output value detection device 51 detecting an output value of the actuator 48 (current value flowing in the actuator 48) is connected to the actuator 48.

The starter 60 starts the diesel engine 1.

As shown in FIG. 1, the starter 60 has an electric engine. The starter 60 is connected to the crankshaft 16 of the engine body 10 and can rotate the crankshaft 16. Following rotation of the crankshaft 16, the starter 60 can stroke vertically the plunger 34.

By rotating the crankshaft 16, the starter 60 starts the diesel engine 1. Start of the diesel engine 1 means the state that the intake stroke, the compression stroke, the expansion stroke and the exhaust stroke are realized sequentially while the starter 60 is stopped.

The control unit 70 controls the actuator 48 and the starter 60.

As shown in FIG. 1, a key switch 80 is connected to the control unit 70.

The key switch 80 is an operation instrument for starting and stopping the diesel engine 1. The key switch 80 can be shifted to an OFF position, an ON position or a START position. When the key switch 80 is operated to the OFF position, the starter 60 and the control unit 70 are not energized and stopped. When the key switch 80 is operated to the ON position, the actuator 48, the starter 60 and the control unit 70 are energized and can be operated. When the key switch 80 is operated from the ON position to the START position, the control unit 70 operates the starter 60 and executes various control programs for starting the diesel engine 1.

The control unit 70 is connected to the actuator 48 and can change the rotation position of the plunger 34 by operating the actuator 48 so as to change the position of the rack 45. By changing the rotation position of the plunger 34, the control unit 70 adjusts the fuel injection amount of the fuel injection pump 30.

The control unit 70 is connected to the starter 60 and can rotate the crankshaft 16 by operating the starter 60 so as to stroke the plunger 34. By operating the starter 60 so as to rotate the crankshaft 16, the control unit 70 can start the diesel engine 1.

The control unit 70 is connected to the position detection device 50 and can obtain information about a detection value of the position of the rack 45 from the position detection device 50.

The control unit 70 is connected to the output value detection device 51 and can obtain information about a detection value of the output value of the actuator 48 from the output value detection device 51.

Figure 3:
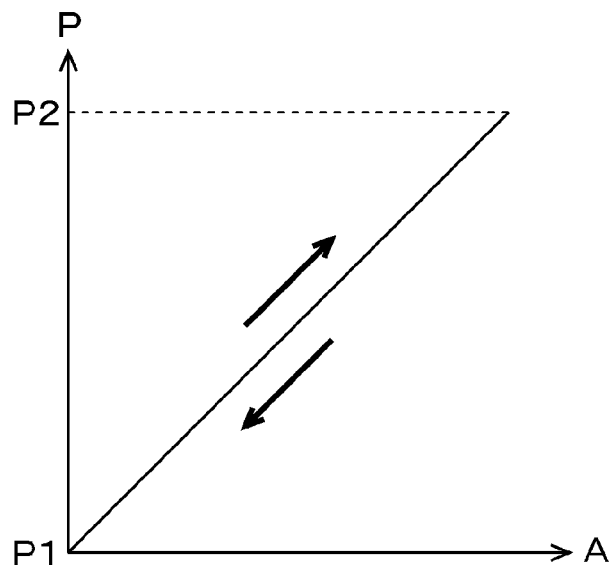
FIG. 3 is a diagram of a map α.

As shown in FIG. 3, a map α is stored in the control unit 70. The map α maps correlation of the output value A of the actuator 48 and the position P of the rack 45 in the case in which the rack 45 is operated normally following drive of the actuator 48. As shown in the map α, the output value A of the actuator 48 is increased following movement of the rack 45 from the end position P1 toward the end position P2, and the output value A of the actuator 48 is reduced following movement from the end position P2 toward the end position P1. That is because the rack 45 is biased toward the end position P1 by the governor spring 49 and biasing power of the governor spring 49 is increased following movement of the rack 45 toward the end position P2.

Steps in the case in which the control unit 70 control the operations of the actuator 48 and the starter 60 following the operation of the key switch 80 are explained referring to FIGS. 4 to 11.

At a step S1, the key switch 80 is operated from the OFF position to the ON position.

Accordingly, the actuator 48, the starter 60 and the control unit 70 are energized.

At a step S2, as shown in FIGS. 5 to 11, when the key switch 80 is operated from the OFF position to the ON position, the control unit 70 checks starting of the diesel engine 1 by the starter 60 (provisional check). Namely, the control unit 70 makes the starter 60 not be operated even if the key switch 80 is operated to the START position.

At a step S3, as shown in FIGS. 5 to 11, the control unit 70 performs operation inspection of the rack 45.

The operation inspection of the rack 45 is that a predetermined operation X is performed by the rack 45 and whether the rack 45 finishes the predetermined operation X for a predetermined period Ta or not is judged.

The predetermined operation X is movement of the rack 45 throughout the movable range P1 to P2. In this embodiment, the control unit 70 moves the rack 45 to the end position P1, the end position P2 and the end position P1 in this order.

The predetermined period Ta is a period of time required normally for finishing the predetermined operation X of the rack 45 when the rack 45 is operated normally following driving of the actuator 48. Information about the predetermined period Ta is stored previously in the control unit 70.

Figure 5:
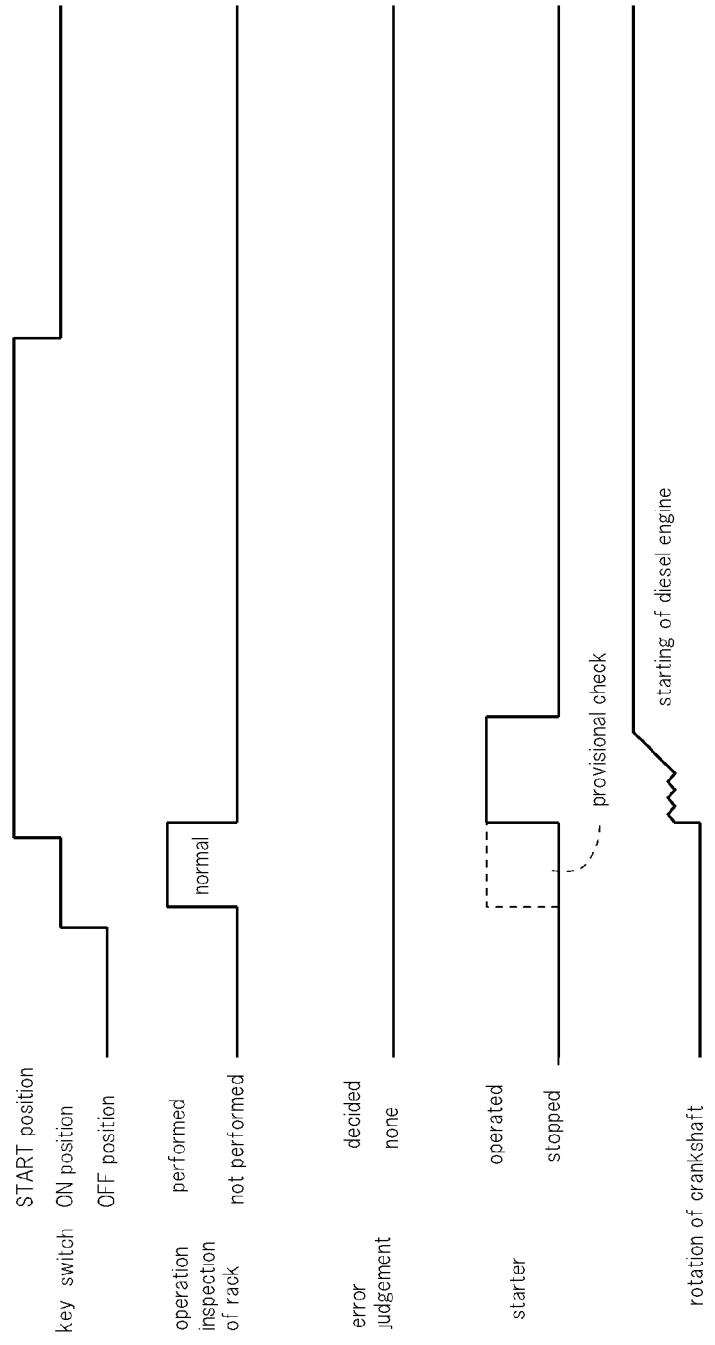
FIG. 5 is an example of a time chart of operation of the diesel engine corresponding to operation of a key switch.

As shown in FIG. 5, when the rack 45 finishes the predetermined operation X for the predetermined period Ta, the control unit 70 judges that the operation of the rack 45 is normal.

As shown in FIGS. 6 to 11, when the rack 45 does not finish the predetermined operation X for the predetermined period Ta, the control unit 70 judges that the operation of the rack 45 is abnormal.

When the operation of the rack 45 is judged to be normal (strep S3, normal), the control unit 70 shifts to a strep S4.

When the operation of the rack 45 is judged to abnormal normal (strep S3, abnormal), the control unit 70 shifts to a strep S7.

At the step S4, the control unit 70 releases the provisional check. Accordingly, when the key switch 80 is operated to the START position, the starter 60 is operated.

At a step S5, the control unit 70 judges whether the key switch 80 is operated to the START position or not.

When the key switch 80 is not operated to the START position and is at the ON position, the control unit 70 stands by until the key switch 80 is operated to the START position. Namely, the control unit 70 does not operate the starter 60 and does not start the diesel engine 1.

When the key switch 80 is operated to the START position, the control shifts to a step S6.

At the step S6, as shown in FIG. 5, the control unit 70 operates the starter 60 so as to start the diesel engine 1.

At the step S7, the control unit 70 judges whether the key switch 80 is operated to the START position or not.

When the key switch 80 is not operated to the START position and is at the ON position, the control unit 70 stands by until the key switch 80 is operated to the START position.

When the key switch 80 is operated to the START position, the control shifts to the step S8.

At the step S8, as shown in FIGS. 6 to 11, the control unit 70 makes the plunger 34 perform preliminary stroke operation on condition that the key switch 80 is held at the START position. Making the plunger 34 perform the preliminary stroke operation means that the plunger 34 is made perform stroke operation by the starter 60 and the stroke operation of the plunger 34 is finished before starting the diesel engine 1. In this embodiment, the control unit 70 energizes the starter 60 for a predetermined energizing period Tb so as to make the plunger 34 perform the preliminary stroke operation. A length of the predetermined energizing period Tb is set so as not to start the diesel engine 1 and found previously. Information about the predetermined energizing period Tb is stored previously in the control unit 70. In this embodiment, when the starter 60 is energized for the predetermined energizing period Tb, that is, when the plunger 34 performs the preliminary stroke operation, the plunger 34 moves for one stroke. Until the plunger 34 performs the preliminary stroke operation, the control unit 70 releases temporarily the provisional check.

Figure 9:
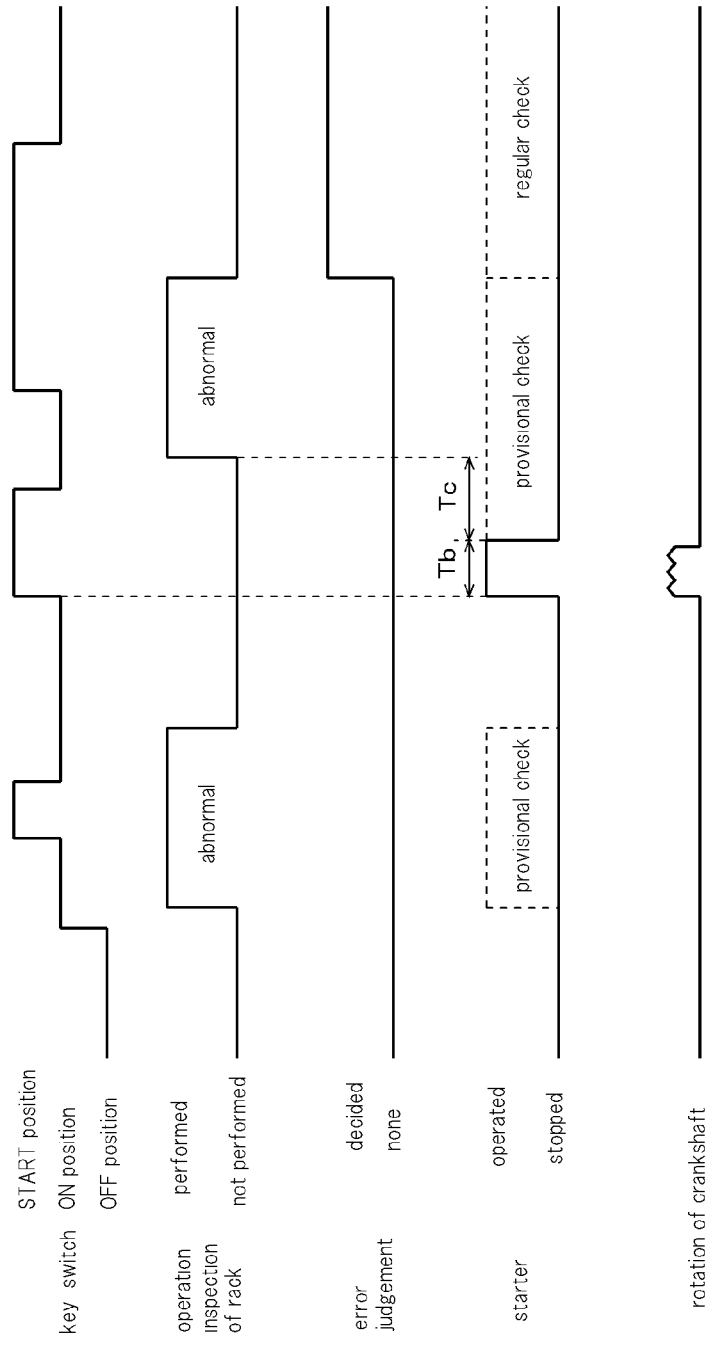
FIG. 9 is an example of a time chart of operation of the diesel engine corresponding to operation of the key switch.

As shown in FIG. 9, when the key switch 80 is at the ON position after the operation inspection of the rack 45, the control unit 70 stands by until the key switch 80 is operated from the ON position to the START position and makes the plunger 34 perform the preliminary stroke operation after the key switch 80 is operated to the START position.

Figure 8:
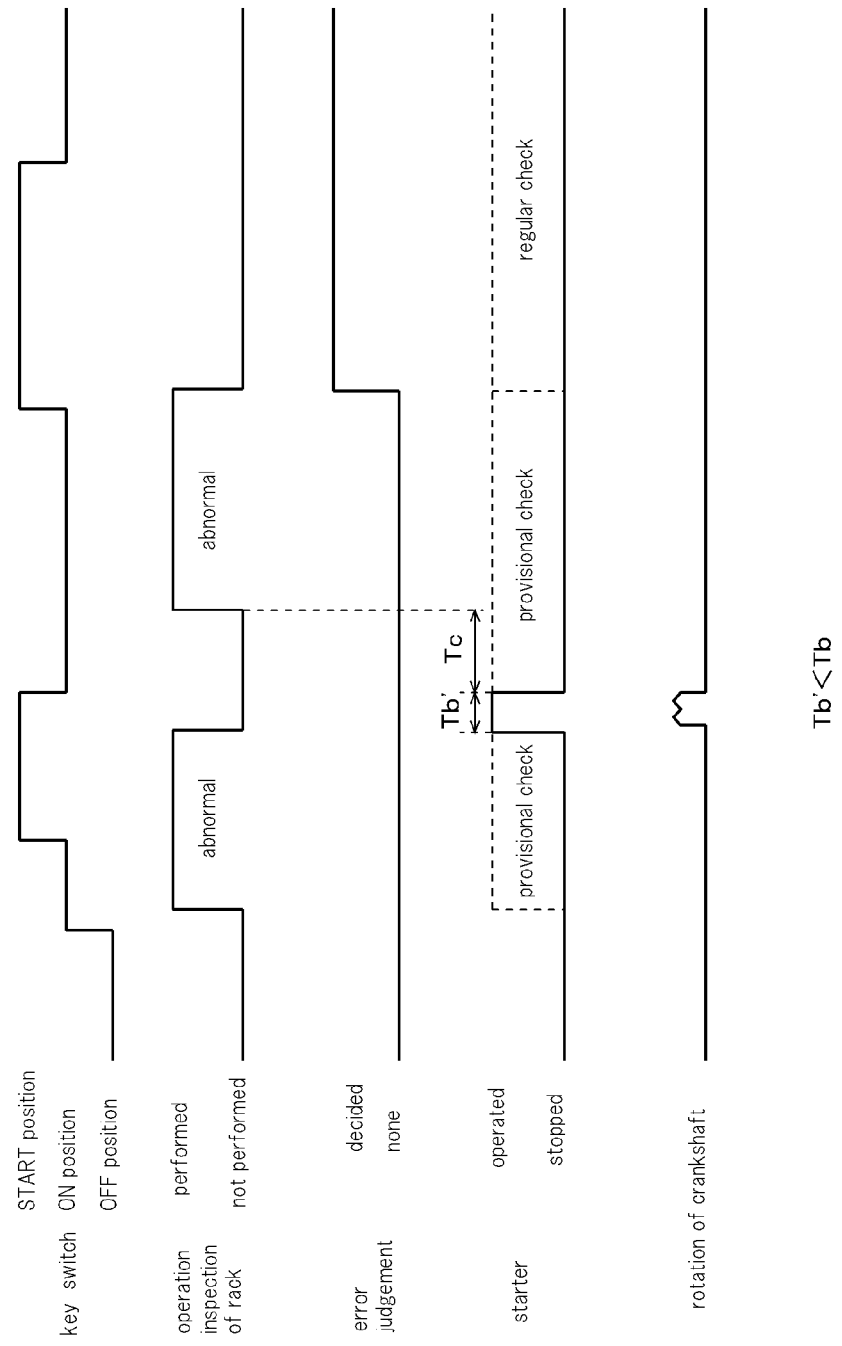
FIG. 8 is an example of a time chart of operation of the diesel engine corresponding to operation of the key switch.

As shown in FIG. 8, when the key switch 80 is operated from the START position to the ON position before the predetermined energizing period Tb passes, the control unit 70 stops the starter 60 and interrupts the preliminary stroke operation of the plunger 34. In this case, though the starter 60 is operated for a period Tb' (Tb'<Tb), the control unit 70 regards that the preliminary stroke operation of the plunger 34 is finished, and shifts to a step S9.

At the step S9, as shown in FIGS. 6 to 11, the control unit 70 stands by for a predetermined standby period Tc. The predetermined standby period Tc is a period of time required for stopping completely the plunger 34 moving from habit after performing the preliminary stroke operation at the step S8. Information about the predetermined standby period Tc is stored previously in the control unit 70. By standing by for the predetermined standby period Tc, accuracy of the operation inspection of the rack 45 at the step S10 can be improved.

At the step S10, as shown in FIGS. 6 to 11, after the predetermined standby period Tc passes, the control unit 70 performs the operation inspection of the rack 45 again.

Figure 11:
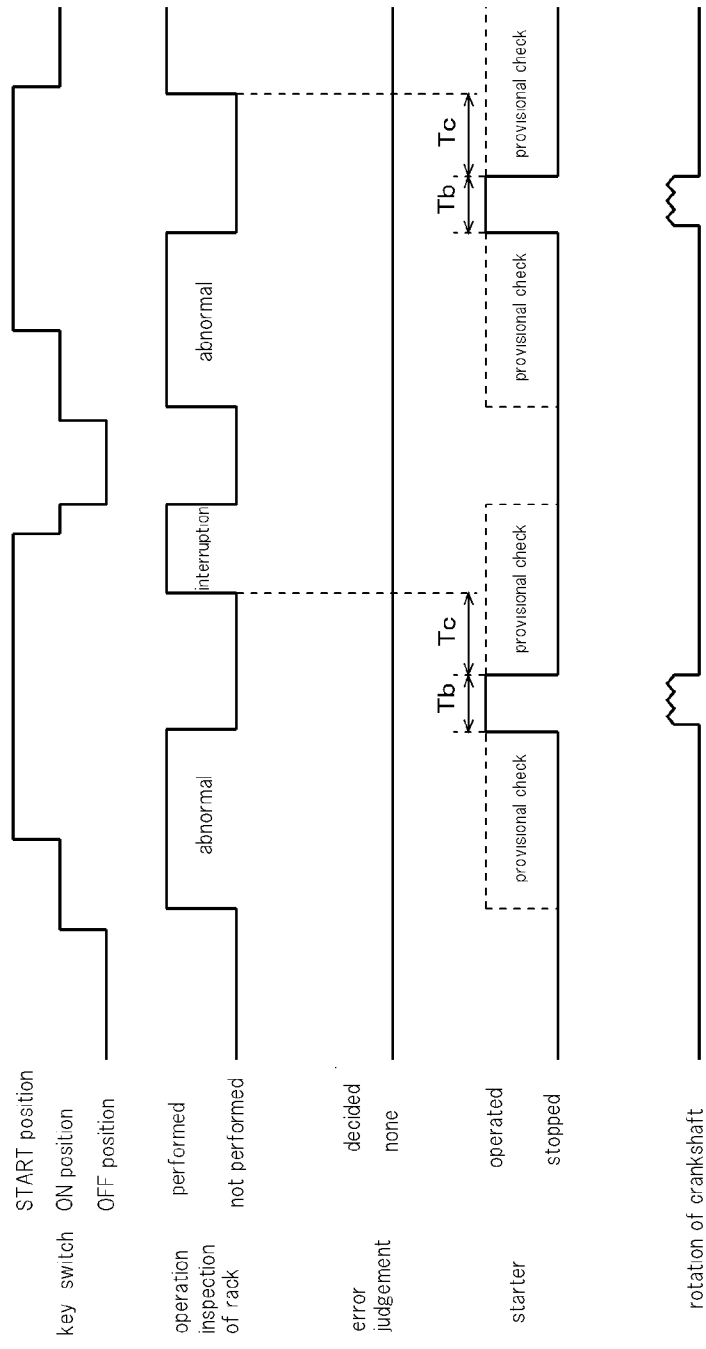
FIG. 11 is an example of a time chart of operation of the diesel engine corresponding to operation of the key switch.

On condition that the key switch 80 is held at the ON position or the START position, the control unit 70 can perform the operation inspection of the rack 45. Accordingly, as shown in FIG. 11, at the time of the operation inspection of the rack 45, when the key switch 80 is operated to the OFF position, the operation inspection of the rack 45 is interrupted.

Figure 6:
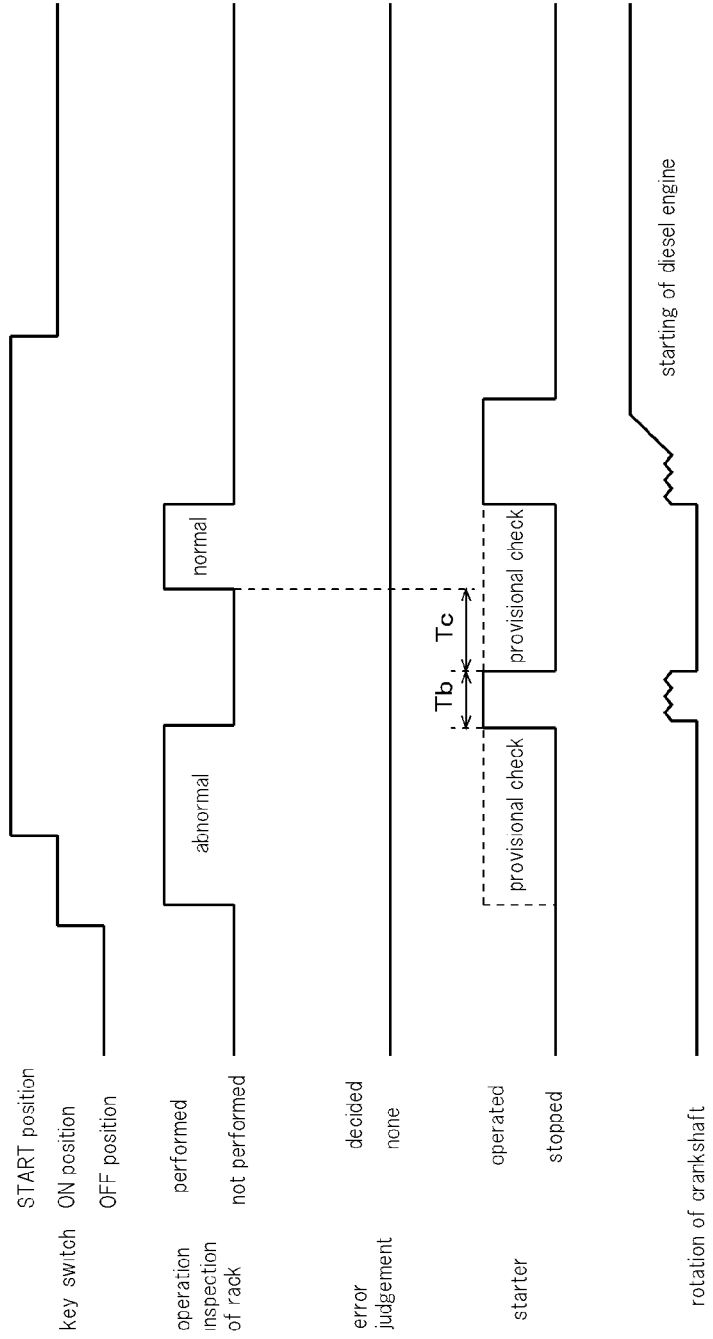
FIG. 6 is an example of a time chart of operation of the diesel engine corresponding to operation of the key switch.

As shown in FIG. 6, when the operation of the rack 45 is judged to be normal (step S10, normal), the control unit 70 shifts to the step S4.

When the operation of the rack 45 is judged to be abnormal (step S10, abnormal), the control unit 70 shifts to the step S11.

At the step S11, as shown in FIGS. 7 to 10, the control unit 70 performs error judgement and checks starting of the diesel engine 1 by the starter 60 (regular check). Namely, the control unit 70 makes the starter 60 not be operated even if the key switch 80 is operated to the START position.

At a step S12, after the control unit 70 performs the regular check, when the key switch 80 is operated to the OFF position (step S12, Yes), the control shifts to a step S13.

At the step S12, after the control unit 70 performs the regular check, when the key switch 80 is held at the ON position or the START position (step S12, No), the error judgement and the regular check are held.

Figure 10:
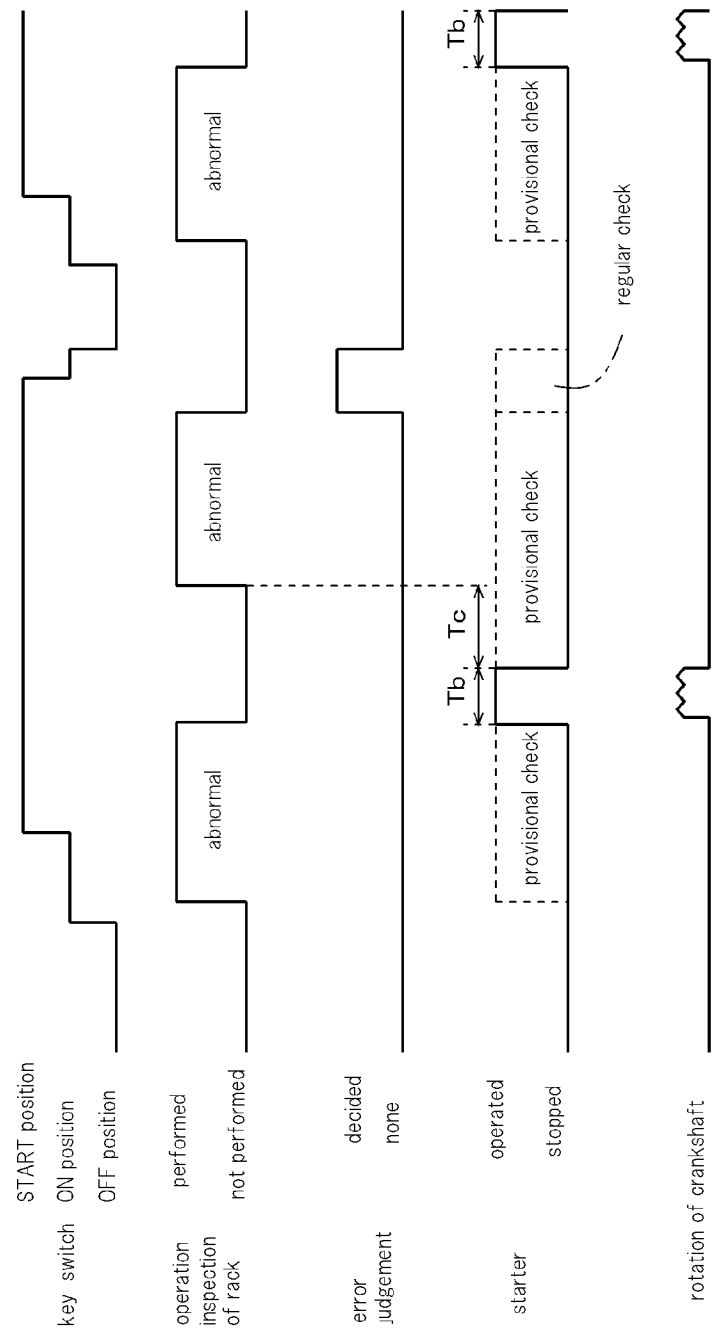
FIG. 10 is an example of a time chart of operation of the diesel engine corresponding to operation of the key switch.

At the step S13, as shown in FIG. 10, when the key switch 80 is operated to the OFF position, the regular check and the error judgement are released. Accordingly, after that, when the key switch 80 is operated from the OFF position to the ON position, the control starts from the step S1.

As shown in FIG. 11, when the key switch 80 is operated to the OFF position while the processes shown in the steps S1 to S11 are performed, the processes are interrupted. Subsequently, when the key switch 80 is operated from the OFF position to the ON position, the control starts from the step S1.

FIGS. 5 to 11 are time charts of the operation of the diesel engine 1 corresponding to the operation of the key switch 80.

As shown in FIG. 5, the control unit 70 judges that the first rack operation inspection is normal, and starts the diesel engine 1.

Figure 4:
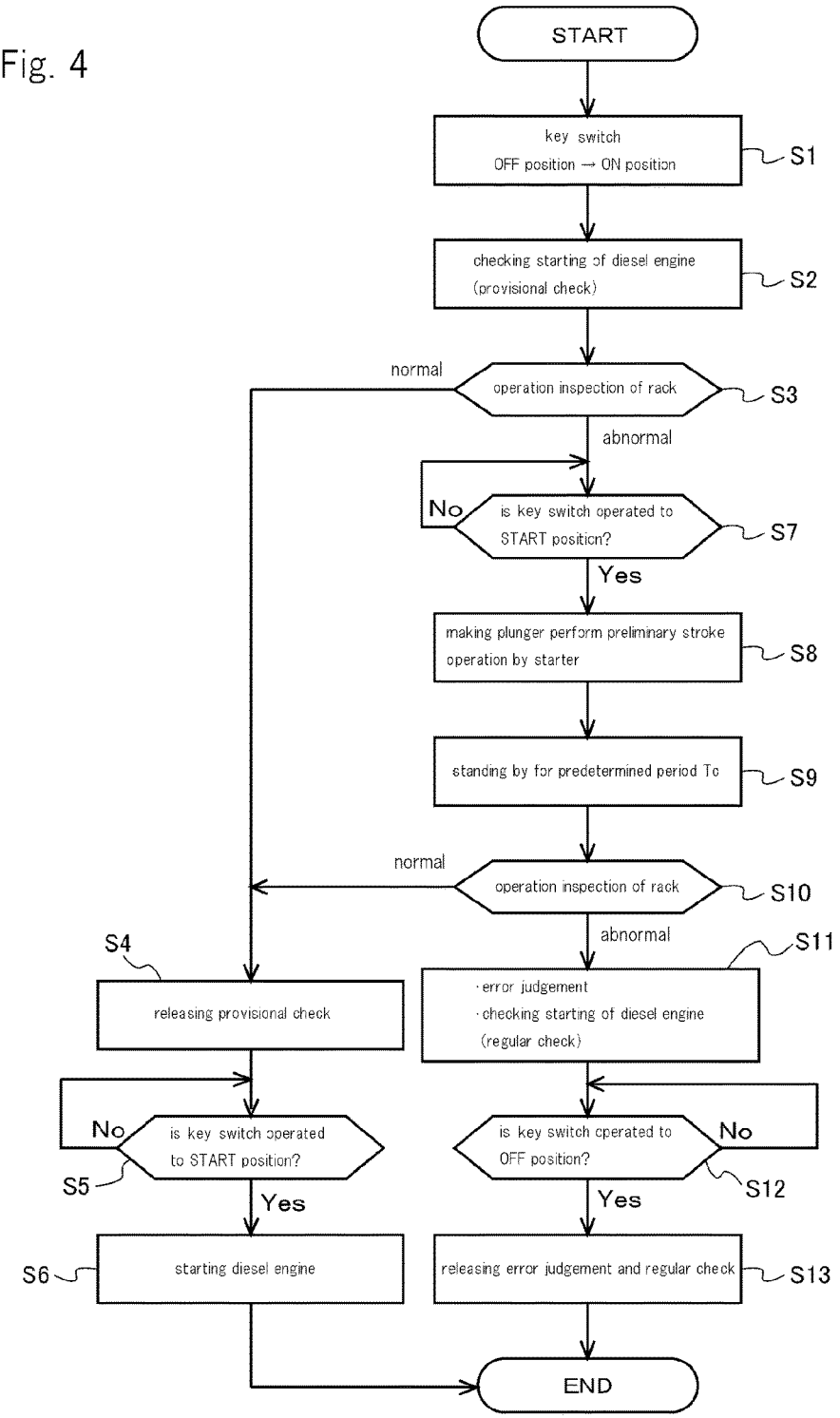
FIG. 4 is a flow chart of operation of the diesel engine.

FIG. 5 shows a time chart of the operation of the diesel engine 1 when the steps shifts to the step S1, the step S2, the step S3, the step S4, the step S5 and the step S6 in this order in the flow chart (see FIG. 4).

As shown in FIG. 6, the control unit 70 judges that the first rack operation inspection is abnormal and the second rack operation inspection is normal, and starts the diesel engine 1.

FIG. 6 shows a time chart of the operation of the diesel engine 1 when the steps shifts to the step S1, the step S2, the step S3, the step S7, the step S8, the step S9, the step S10, the step S4, the step S5 and the step S6 in this order in the flow chart (see FIG. 4).

Figure 7:
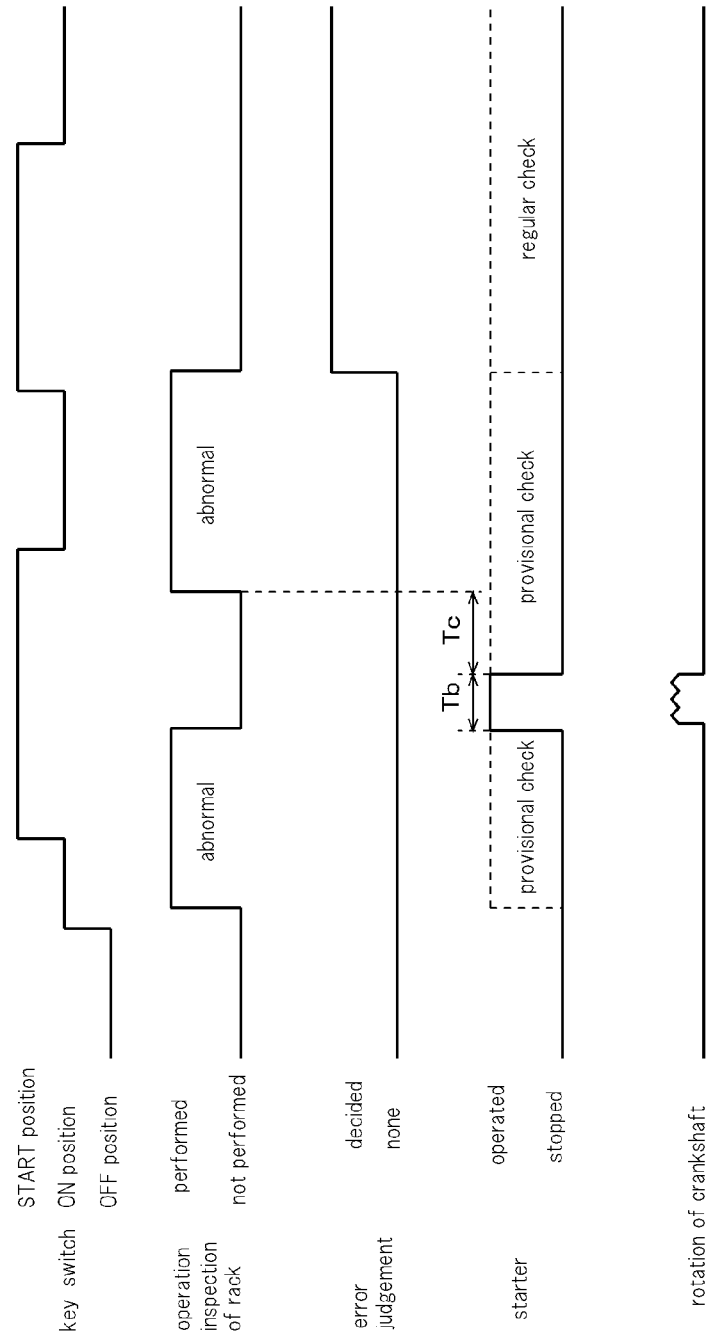
FIG. 7 is an example of a time chart of operation of the diesel engine corresponding to operation of the key switch.

As shown in FIG. 7, the control unit 70 performs the rack operation inspection twice and judges that each inspection is abnormal, and performs the regular check.

FIG. 7 shows a time chart of the operation of the diesel engine 1 when the steps shifts to the step S1, the step S2, the step S3, the step S7, the step S8, the step S9, the step S10 and the step S11 in this order in the flow chart (see FIG. 4).

As shown in FIG. 8, the control unit 70 performs the rack operation inspection twice and judges that each inspection is abnormal, and performs the regular check.

FIG. 8 shows a time chart of the operation of the diesel engine 1 when the steps shifts to the step S1, the step S2, the step S3, the step S7, the step S8, the step S9, the step S10 and the step S11 in this order in the flow chart (see FIG. 4).

As shown in FIG. 9, the control unit 70 performs the rack operation inspection twice and judges that each inspection is abnormal, and performs the regular check.

FIG. 9 shows a time chart of the operation of the diesel engine 1 when the steps shifts to the step S1, the step S2, the step S3, the step S7, the step S8, the step S9, the step S10 and the step S11 in this order in the flow chart (see FIG. 4).

As shown in FIG. 10, the control unit 70 performs the rack operation inspection twice and judges that each inspection is abnormal, and performs the regular check. Then, since the key switch 80 is operated to the OFF position, the control unit 70 releases the regular check. Subsequently, since the key switch 80 is operated to the ON position, the control unit 70 redoes from the step S1.

FIG. 10 shows a time chart of the operation of the diesel engine 1 when the steps shifts to the step S1, the step S2, the step S3, the step S7, the step S8, the step S9, the step S10, the step S11, the step S12, the step S13, the step S1, the step S2, the step S3, the step S7 and the step S8 in this order in the flow chart (see FIG. 4).

As shown in FIG. 11, the control unit 70 judges that the first rack operation inspection is abnormal. Then, since the key switch 80 is operated to the OFF position in the midst of the second rack operation inspection, the control unit 70 interrupts the second rack operation inspection. Subsequently, since the key switch 80 is operated to the ON position, the control unit 70 redoes from the step S1.

FIG. 10 shows a time chart of the operation of the diesel engine 1 when the steps shifts to the step S1, the step S2, the step S3, the step S7, the step S8, the step S9, the step S10, the step S1, the step S2, the step S3, the step S7, the step S8, the step S9 and the step S10 in this order in the flow chart (see FIG. 4).

According to the above configuration, even if the plunger 34 is adhered by a film of fuel or the like formed on an outer perimeter of the plunger 34 and the plunger 34 is hardly to be rotated and as a result the operation of the rack 45 is judged to be abnormal by the control unit 70 at the step S3, the control unit 70 makes the plunger 34 perform the preliminary stroke operation by the starter 60 so as to remove the film of fuel or the like as shown in the step S8. Accordingly, the diesel engine 1 can be started smoothly.

As shown in FIGS. 7 to 10, in this embodiment, the control unit 70 can perform the operation inspection of the rack 45 up to twice before performing the regular check (error judgement). However, the present invention is not limited thereto, and the control unit 70 may perform the operation inspection of the rack 45 two or more times before performing the regular check.

Namely, when the rack 45 cannot finish the predetermined operation X for the predetermined period Ta until the control unit 70 repeats by turns the operation inspection of the rack 45 (the process in which the rack 45 is made perform the predetermined operation X by the actuator 48) and the process in which the plunger 34 is made perform the preliminary stroke operation by the starter 60 (see the step S8) for a predetermined number of times N, the control unit 70 checks the starting of the diesel engine 1 by the starter 60 (regular check). The predetermined number of times N can be set freely by an operator or the like.

For example, in the case in which the control unit 70 can perform the operation inspection of the rack 45 for three times before the regular check, when the regular check is performed, the control unit 70 performs the operation inspection of the rack 45 (first time), the abnormality judgement, the preliminary stroke operation of the plunger 34, the operation inspection of the rack 45 (second time), the abnormality judgement, the preliminary stroke operation of the plunger 34, the operation inspection of the rack 45 (third time), the abnormality judgement, and the regular check in this order.

The diesel engine 1 may have a notice means 90 which notifies an operator that the control unit 70 checks the starting of the diesel engine 1 by the starter 60 (regular check).

For example, the notice means 90 is configured by a voice generating means or a picture display means. As shown in FIG. 1, the notice means 90 is connected to the control unit 70.

Operation of the notice means 90 is explained below.

At the step S11, when the regular check is performed, the control unit 70 transmits an error signal to the notice means 90. Then, when the error signal is received, the notice means 90 notifies an operator that the regular check is performed to by voice, picture display or the like.

Accordingly, the operator can recognize that mechanical failure may exist in the plunger 34, the rack 45 or the like.

When the operation inspection of the rack 45 is performed at the step S3 and the step S10, the control unit 70 may perform abnormality judgement with below method.

Figure 12:
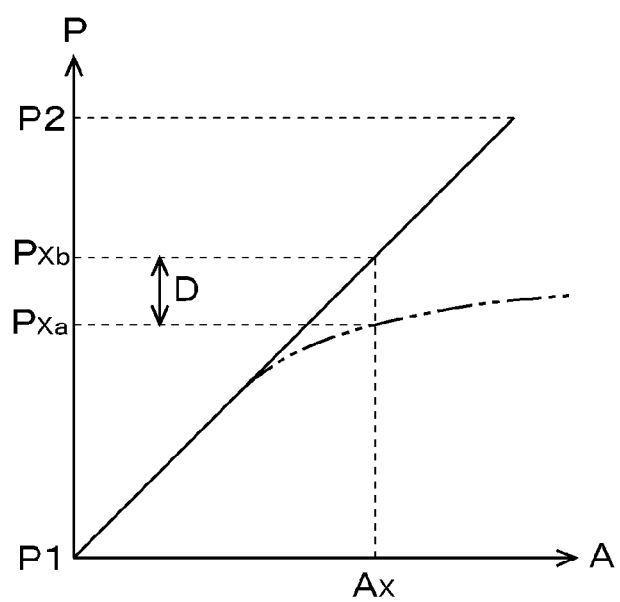
FIG. 12 is a diagram of the map α.

As shown in FIG. 12, when the operation inspection of the rack 45 is performed, the control unit 70 obtains information about a detection value $P_{Xa}$ of the position of the rack 45 from the position detection device 50 and obtains information about a detection value $A_X$ of the output value of the actuator 48 from the output value detection device 51. Then, the control unit 70 calculates a target position $P_{Xb}$ of the rack 45 corresponding to the detection value $A_X$ of the output value of the actuator 48 based on the map α. Then, the control unit 70 calculates a difference D of the detection value $P_{Xa}$ of the position of the rack 45 and the target position $P_{Xb}$ of the rack 45 (=$P_{Xb}$−Pxa).

Then, when the difference D is not less than a predetermined value Dα, the control unit 70 judges that the operation of the rack 45 is abnormal, that is, the rack 45 cannot finish the predetermined operation X for the predetermined period Ta. That is because the operation of the rack 45 becomes slow following increase of the difference D and possibility that the rack 45 cannot finish the predetermined operation X for the predetermined period Ta is raised. The predetermined value Dα is found by an experiment or the like. The predetermined value Dα is stored previously in the control unit 70.

According to the above configuration, the control unit 70 can judge that the operation of the rack 45 is abnormal at an early stage. Excessive load applied on the actuator 48 can be suppressed.

The control unit 70 may not perform the operation inspection of the rack 45 at the step S3 when a temperature of cooling water of the diesel engine 1 is not more than 0° C. while the key switch 80 is operated from the OFF position to the ON position. That is because when the temperature of cooling water of the diesel engine 1 is not more than 0° C., viscosity of pressure oil and lubricating oil is raised so that the operation of the rack 45 becomes slow though the plunger 34 can be moved smoothly, whereby accuracy of the operation inspection of the rack 45 may fall.

However, in the case in which the operation inspection of the rack 45 was performed by the control unit 70 and the operation of the rack 45 is judged to be abnormal in the past (for example, at the time of last starting), the control unit 70 performs the operation inspection of the rack 45 even if the temperature of cooling water of the diesel engine 1 is not more than 0° C. Accordingly, in such a case, the control unit 70 can obtain more data of operation state of the diesel engine 1 for maintenance of the diesel engine 1.

Second Embodiment

A diesel engine 2 which is a second embodiment of the diesel engine of the present invention is explained.

In below explanation, differences from the diesel engine 1 are focused, and the same configurations as the diesel engine 1 are designated by the same reference numerals and detailed explanations thereof are omitted.

Figure 13:
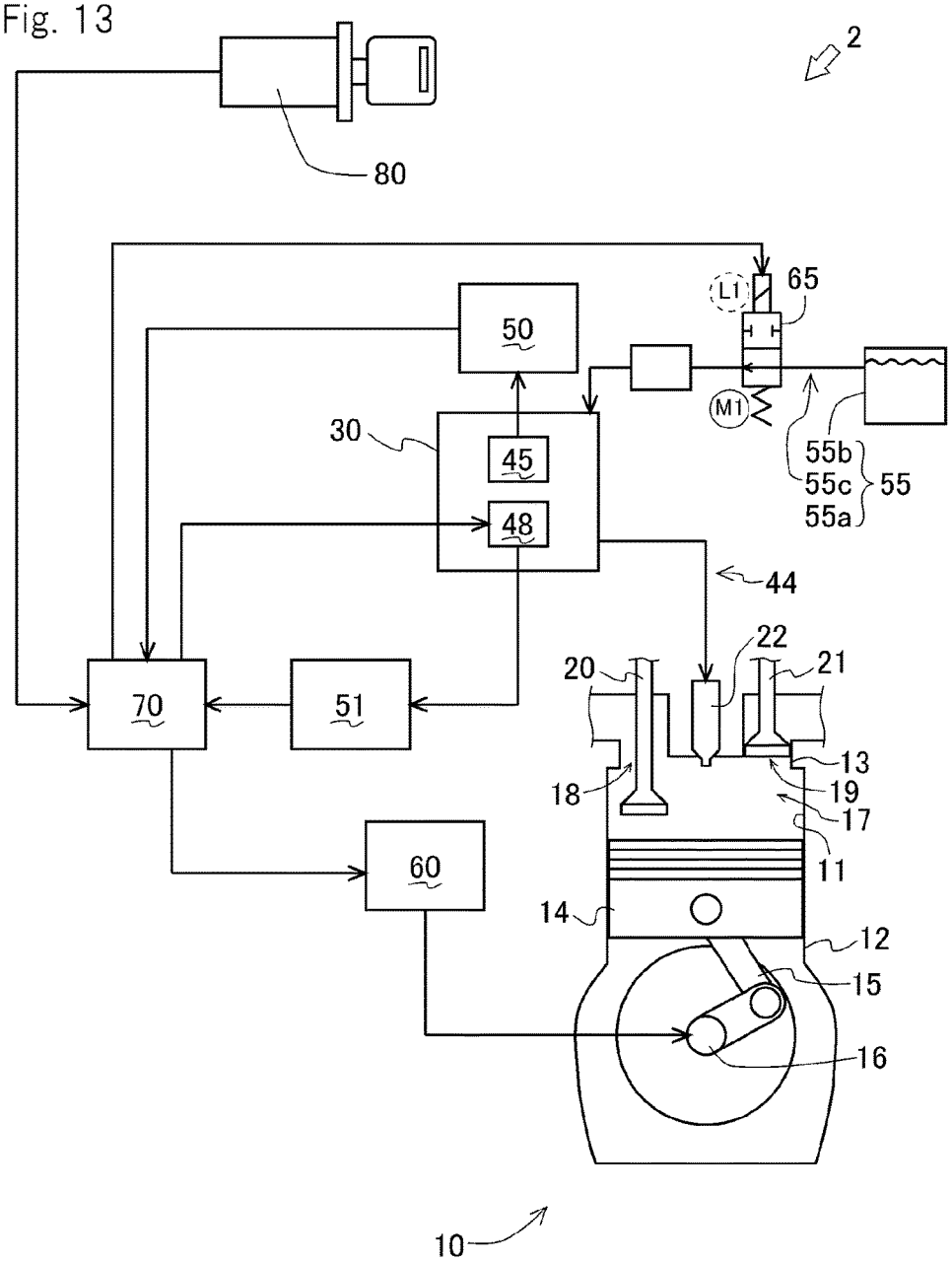
FIG. 13 is a drawing of a schematic configuration of a diesel engine of a second embodiment.

As shown in FIG. 13, the diesel engine 2 has the engine body 10, the fuel injection pump 30 (see FIG. 2), a fuel supply part 55, the starter 60, a shutoff valve 65 and the control unit 70.

As shown in FIGS. 2 and 13, fuel sent pressingly from the fuel supply part 55 is supplied to the main port 39 provided in the plunger barrel 33.

The fuel supply part 55 supplies fuel to the fuel injection pump 30.

Figure 14:
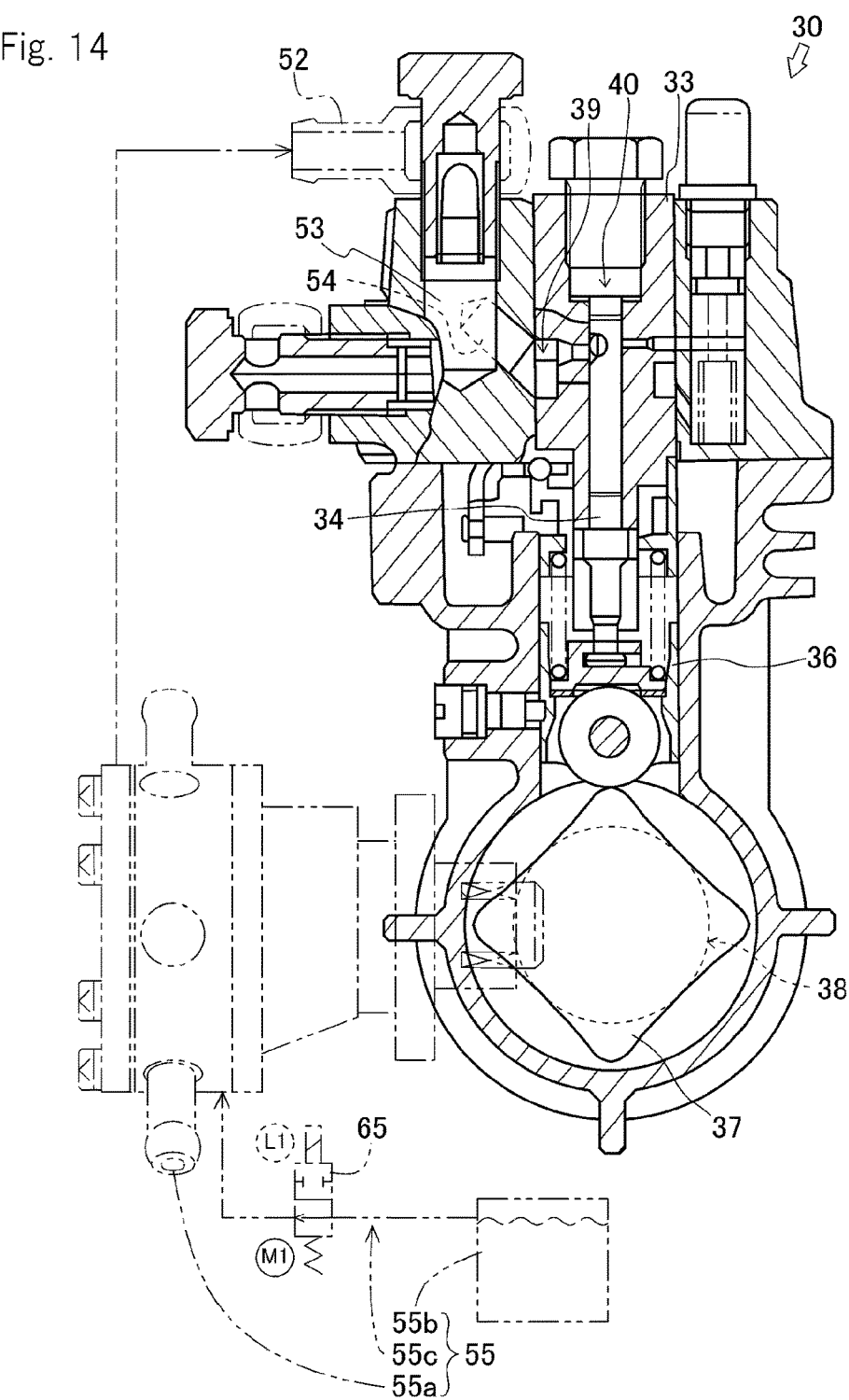
FIG. 14 is a sectional view of the fuel injection pump.

As shown in FIG. 14, the fuel supply part 55 has a pump (feed pump) 55a, a fuel tank 55b and a fuel supply pipe 55c. The pump 55a is connected to the camshaft 38 and driven following rotation of the camshaft 38 (that is, stroke operation of the plunger 34). The pump 55a is connected via the fuel supply pipe 55c to the fuel tank 55b. The pump 55a is connected via a pipe connector 52 and a fuel supply passage 53 provided in an upper part of the fuel injection pump 30 to a fuel gallery 54. The fuel gallery 54 is connected to the main port 39.

By driving the pump 55a, fuel in the fuel tank 55b is sent pressingly via the fuel supply pipe 55c, the pipe connector 52, the fuel supply passage 53 and the fuel gallery 54 and supplied to the main port 39.

As shown in FIGS. 2 and 14, when the plunger 34 moves to the lowest position in the vertical movable range (bottom dead center), the fuel pressure chamber 40 formed above the plunger 34 in the plunger barrel 33 is communicated with the main port 39, and the fuel is introduced into the fuel pressure chamber 40.

On the other hand, when the plunger 34 is pushed up by the cam 37 and raised, the communication port of the main port 39 to the fuel pressure chamber 40 is closed by an outer wall of the plunger 34.

As a result, fuel in the fuel pressure chamber 40 is sent pressingly via the distribution port 41 to the distribution shaft 42 following rising of the plunger 34. Then, the fuel sent pressingly to the distribution shaft 42 is distributed to the delivery valve 43 by the distribution shaft 42, passes through the injection pipe 44, and is injected from the fuel injection nozzle 22 of the engine body 10 and supplied into the combustion chamber 17.

When the plunger 34 is raised further, the plunger lead 34a formed in the plunger 34 is communicated with the main port 39, and the inside of the plunger barrel 33 is communicated with the main port 39.

As a result, fuel in the plunger barrel 33 flows reversely to the side of the fuel supply part 55 of the main port 39. Namely, fuel injection by the fuel injection pump 30 is stopped.

As shown in FIG. 13, the shutoff valve 65 switches passages of fuel. The shutoff valve 65 is configured by an electromagnetic valve, and can be switched to a position L1 or a position M1 by sliding a spool. The shutoff valve 65 is provided in the fuel supply pipe 55c.

When the spool is at the position L1 (closed state), the shutoff valve 65 closes the fuel supply pipe 55c so that fuel is not supplied from the fuel supply part 55 to the fuel injection pump 30. As a result, fuel cannot be injected from the fuel injection pump 30, whereby fuel cannot be supplied from the fuel injection pump 30 into the combustion chamber 17.

When the spool is at the position M1 (opened state), the shutoff valve 65 opens the fuel supply pipe 55c so that fuel is supplied from the fuel supply part 55 to the fuel injection pump 30. As a result, fuel can be injected from the fuel injection pump 30, whereby fuel can be supplied from the fuel injection pump 30 into the combustion chamber 17.

In this embodiment, the shutoff valve 65 is configured by the electromagnetic valve. However, the present invention is not limited thereto, and another member which can open and close the fuel supply pipe 55c may alternatively be used.

The control unit 70 controls the actuator 48 and the starter 60.

The control unit 70 is connected to the shutoff valve 65 and can control operation of the shutoff valve 65.

Steps in the case in which the control unit 70 control the operations of the actuator 48, the starter 60 and the shutoff valve 65 following the operation of the key switch 80 are explained referring to FIGS. 15 to 22.

At a step S21, the key switch 80 is operated from the OFF position to the ON position. Accordingly, the actuator 48, the starter 60 and the control unit 70 are energized.

At a step S22, as shown in FIGS. 16 to 22, when the key switch 80 is operated from the OFF position to the ON position, the control unit 70 checks starting of the diesel engine 2 by the starter 60 (provisional check). Namely, the control unit 70 makes the starter 60 not be operated even if the key switch 80 is operated to the START position.

At a step S23, as shown in FIGS. 16 to 22, the control unit 70 performs operation inspection of the rack 45.

The operation inspection of the rack 45 is that the predetermined operation X is performed by the rack 45 and whether the rack 45 finishes the predetermined operation X for the predetermined period Ta or not is judged.

The predetermined operation X is movement of the rack 45 throughout the movable range P1 to P2. In this embodiment, the control unit 70 moves the rack 45 to the end position P1, the end position P2 and the end position P1 in this order.

The predetermined period Ta is a period of time required normally for finishing the predetermined operation X of the rack 45 when the rack 45 is operated normally following driving of the actuator 48. Information about the predetermined period Ta is stored previously in the control unit 70.

Figure 16:
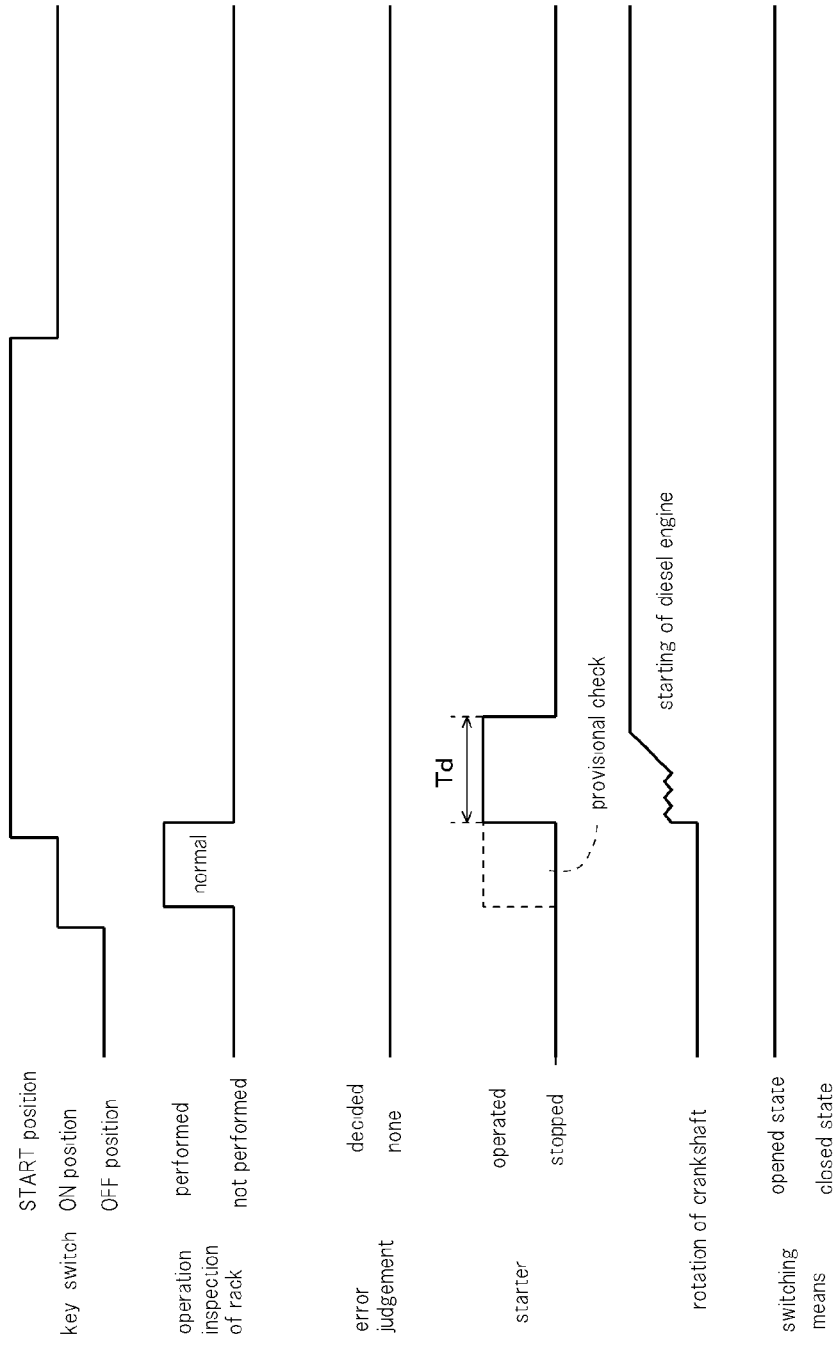
FIG. 16 is an example of a time chart of operation of the diesel engine corresponding to operation of the key switch.

As shown in FIG. 16, when the rack 45 finishes the predetermined operation X for the predetermined period Ta, the control unit 70 judges that the operation of the rack 45 is normal.

As shown in FIGS. 17 to 22, when the rack 45 does not finish the predetermined operation X for the predetermined period Ta, the control unit 70 judges that the operation of the rack 45 is abnormal.

When the operation of the rack 45 is judged to be normal (strep S23, normal), the control unit 70 shifts to a strep S24.

When the operation of the rack 45 is judged to abnormal normal (strep S23, abnormal), the control unit 70 shifts to a strep S29.

At the step S24, the control unit 70 releases the provisional check.

At a step S25, the control unit 70 judges whether the key switch 80 is operated to the START position or not.

When the key switch 80 is not operated to the START position and is at the ON position, the control unit 70 stands by until the key switch 80 is operated to the START position.

When the key switch 80 is operated to the START position, the control shifts to a step S26.

At the step S26, the control unit 70 switches the shutoff valve 65 to the opened state.

Accordingly, fuel can be supplied from the fuel injection pump 30 into the combustion chamber 17.

At a step S27, as shown in FIG. 16, the control unit 70 energizes the starter 60 for a predetermined energizing period Td so as to make the plunger 34 perform the stroke operation. In this case, since the shutoff valve 65 is switched to the opened state at the step S26, fuel is supplied from the fuel injection pump 30 into the combustion chamber 17.

The predetermined energizing period Td is a period of time of operation of the starter 60 required normally for starting the diesel engine 2. Information about the predetermined energizing period Td is stored previously in the control unit 70.

At a step S28, as shown in FIG. 16, the control unit 70 operates the starter 60 for the predetermined energizing period Td while the shutoff valve 65 is switched to the opened state so as to start the diesel engine 2.

At the step S29, the control unit 70 judges whether the key switch 80 is operated to the START position or not.

When the key switch 80 is not operated to the START position and is at the ON position, the control unit 70 stands by until the key switch 80 is operated to the START position.

When the key switch 80 is operated to the START position, the control shifts to a step S30.

At the step S30, as shown in FIGS. 17 to 22, the control unit 70 switches the shutoff valve 65 to the closed state. Accordingly, fuel can be supplied from the fuel injection pump 30 into the combustion chamber 17.

At a step S31, as shown in FIGS. 17 to 22, the control unit 70 energizes the starter 60 for a predetermined energizing period Te so as to make the plunger 34 perform the stroke operation. In this case, since the shutoff valve 65 is switched to the closed state at the step S30, fuel is not supplied from the fuel injection pump 30 into the combustion chamber 17. Accordingly, the control unit 70 makes the plunger 34 perform the stroke operation by the starter 60 while the diesel engine 2 cannot be started by the starter 60.

A length of the predetermined energizing period Te is not limited especially if it is enough for the stroke operation of the plunger 34 and can be determined freely by an operator. For example, the predetermined energizing period Te may have the same length as the predetermined energizing period Td. Information about the predetermined energizing period Te is stored previously in the control unit 70.

While making the plunger 34 perform the stroke operation, the control unit 70 releases temporarily the provisional check.

Figure 20:
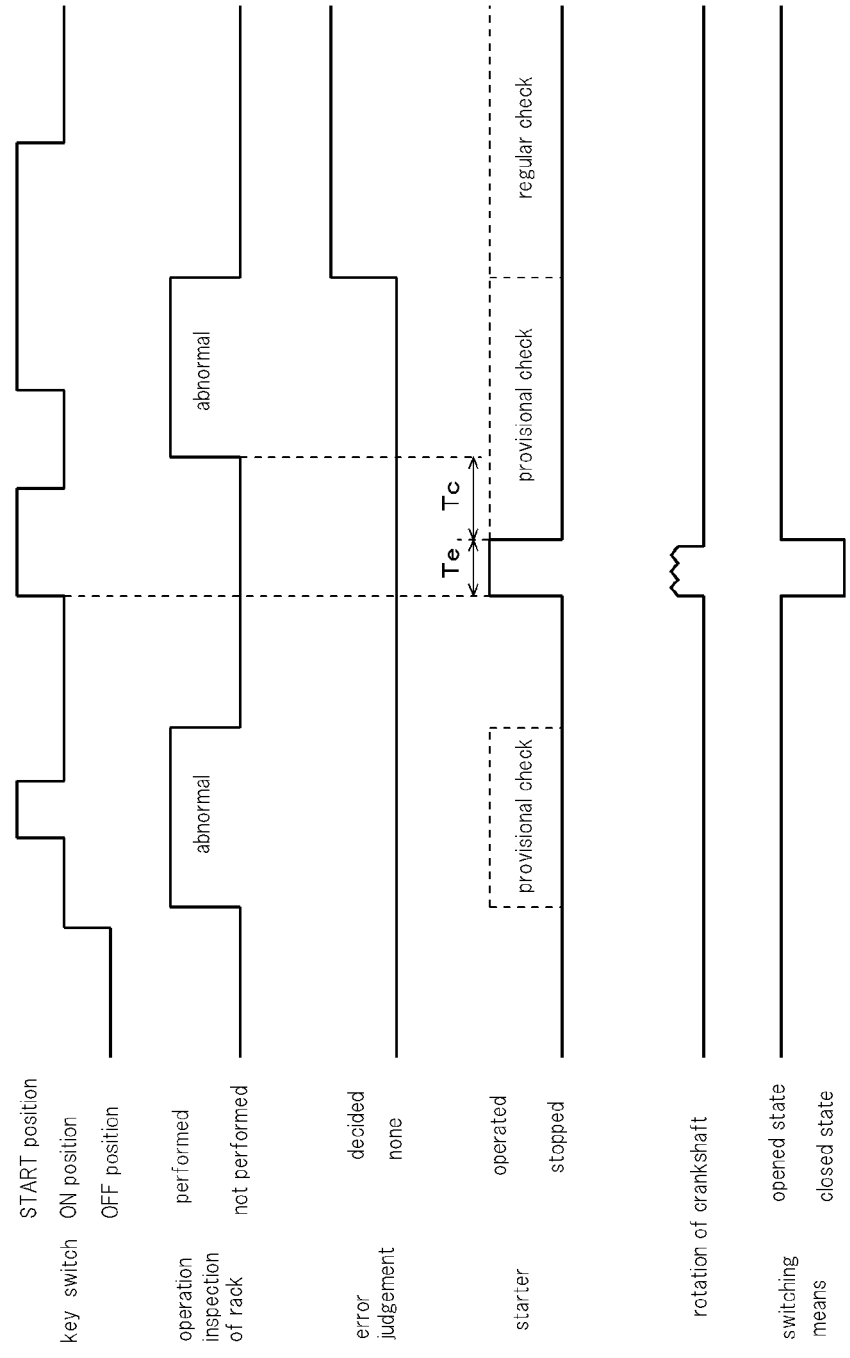
FIG. 20 is an example of a time chart of operation of the diesel engine corresponding to operation of the key switch.

As shown in FIG. 20, when the key switch 80 is at the ON position after the operation inspection of the rack 45, the control unit 70 stands by until the key switch 80 is operated from the ON position to the START position and makes the plunger 34 perform the stroke operation (rotation of the crankshaft 16) after the key switch 80 is operated to the START position.

Figure 19:
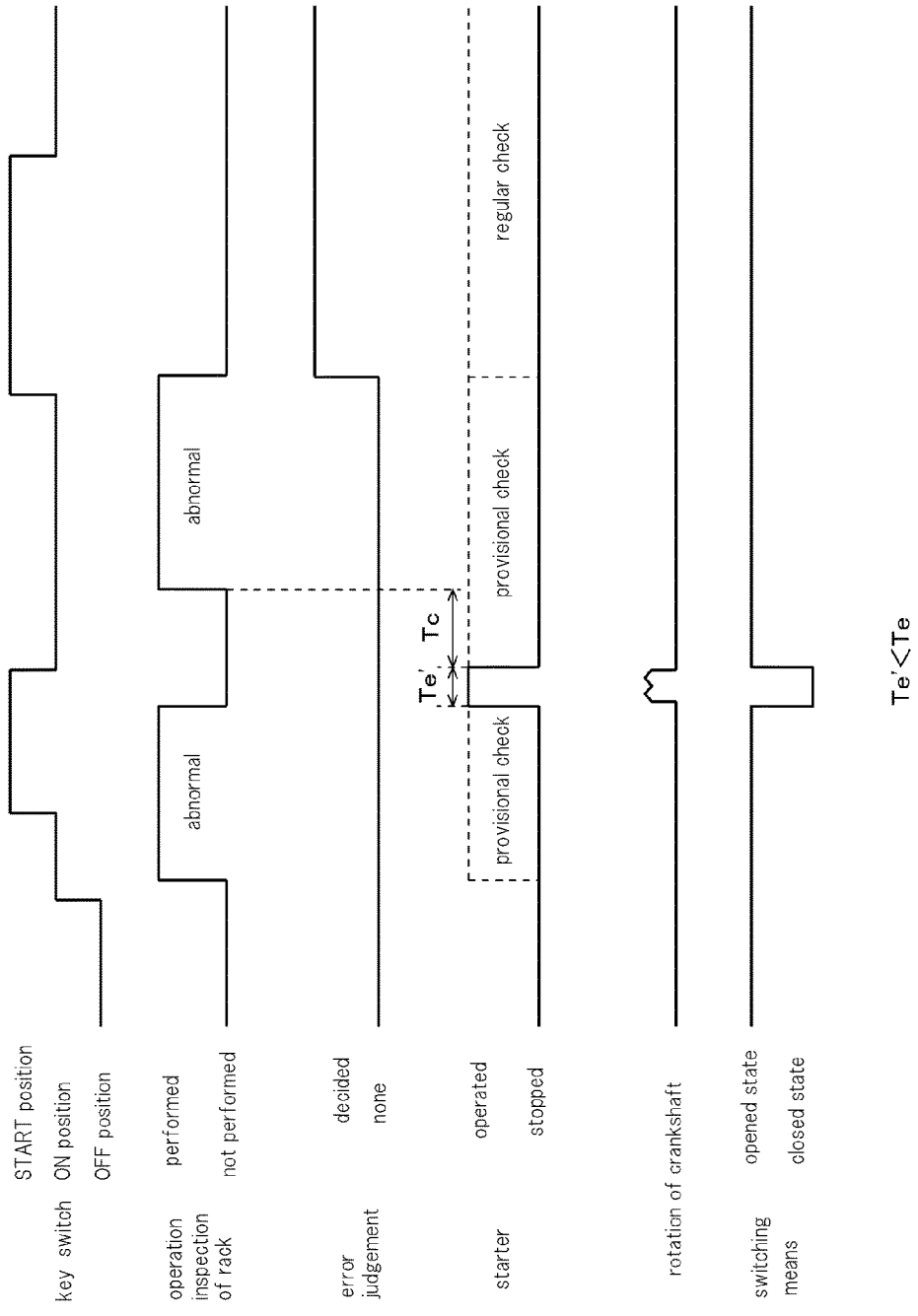
FIG. 19 is an example of a time chart of operation of the diesel engine corresponding to operation of the key switch.

As shown in FIG. 19, when the key switch 80 is operated from the START position to the ON position before the predetermined energizing period Te passes, the control unit 70 stops the starter 60 and interrupts the stroke operation of the plunger 34 (rotation of the crankshaft 16). In this case, though the starter 60 is operated for a period Te' (Te'<Te), the control unit 70 regards that the preliminary stroke operation of the plunger 34 is finished, and shifts to a step S32.

At the step S32, as shown in FIGS. 17 to 22, the control unit 70 stands by for the predetermined standby period Tc. The predetermined standby period Tc is a period of time required for stopping completely the plunger 34 moving from habit after performing the preliminary stroke operation at the step S31. Information about the predetermined standby period Tc is stored previously in the control unit 70. By standing by for the predetermined standby period Tc, accuracy of the operation inspection of the rack 45 at a step S33 can be improved.

At the step S33, as shown in FIGS. 17 to 22, after the predetermined standby period Tc passes, the control unit 70 performs the operation inspection of the rack 45 again.

Figure 22:
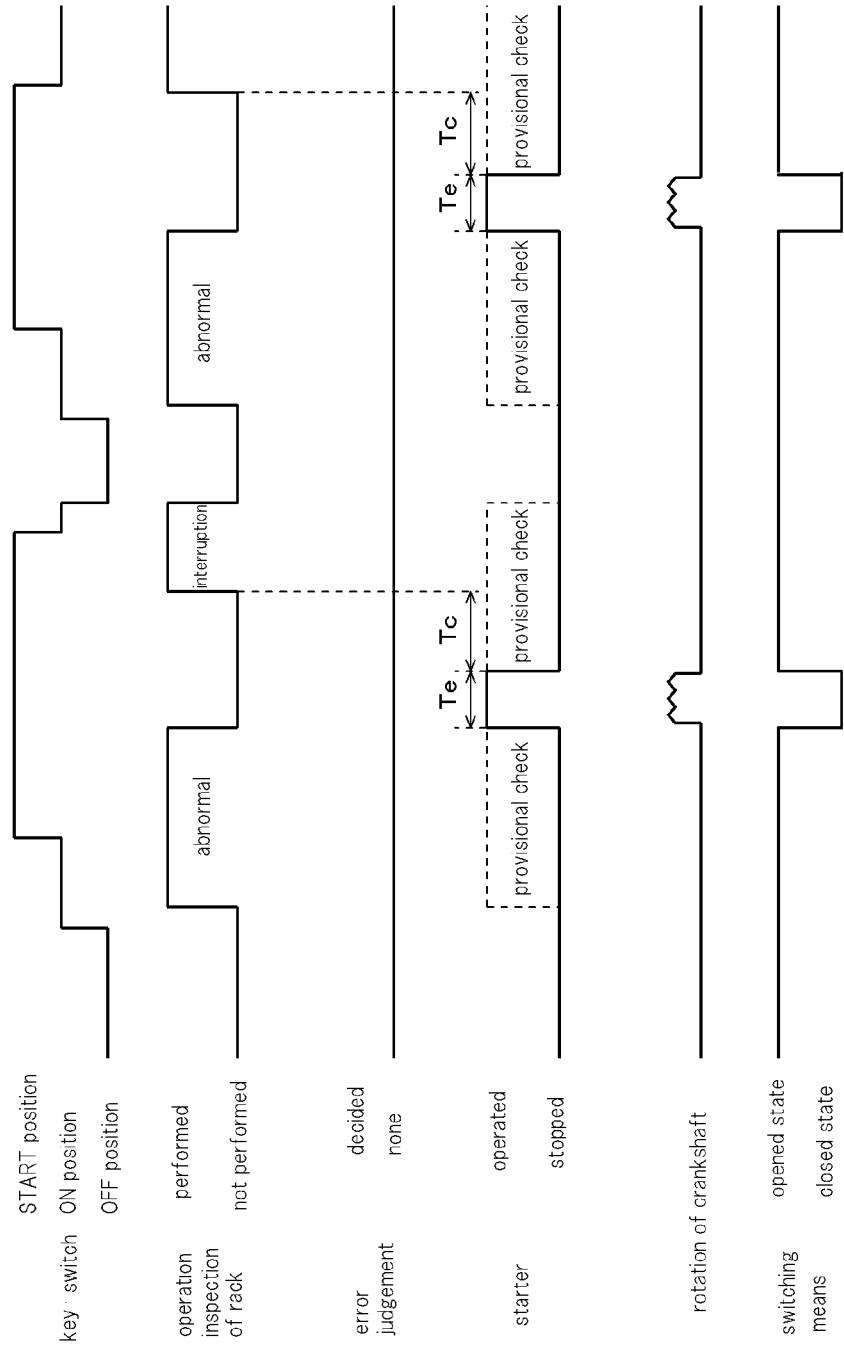
FIG. 22 is an example of a time chart of operation of the diesel engine corresponding to operation of the key switch.

On condition that the key switch 80 is held at the ON position or the START position, the control unit 70 can perform the operation inspection of the rack 45. Accordingly, as shown in FIG. 22, at the time of the operation inspection of the rack 45, when the key switch 80 is operated to the OFF position, the operation inspection of the rack 45 is interrupted.

Figure 17:
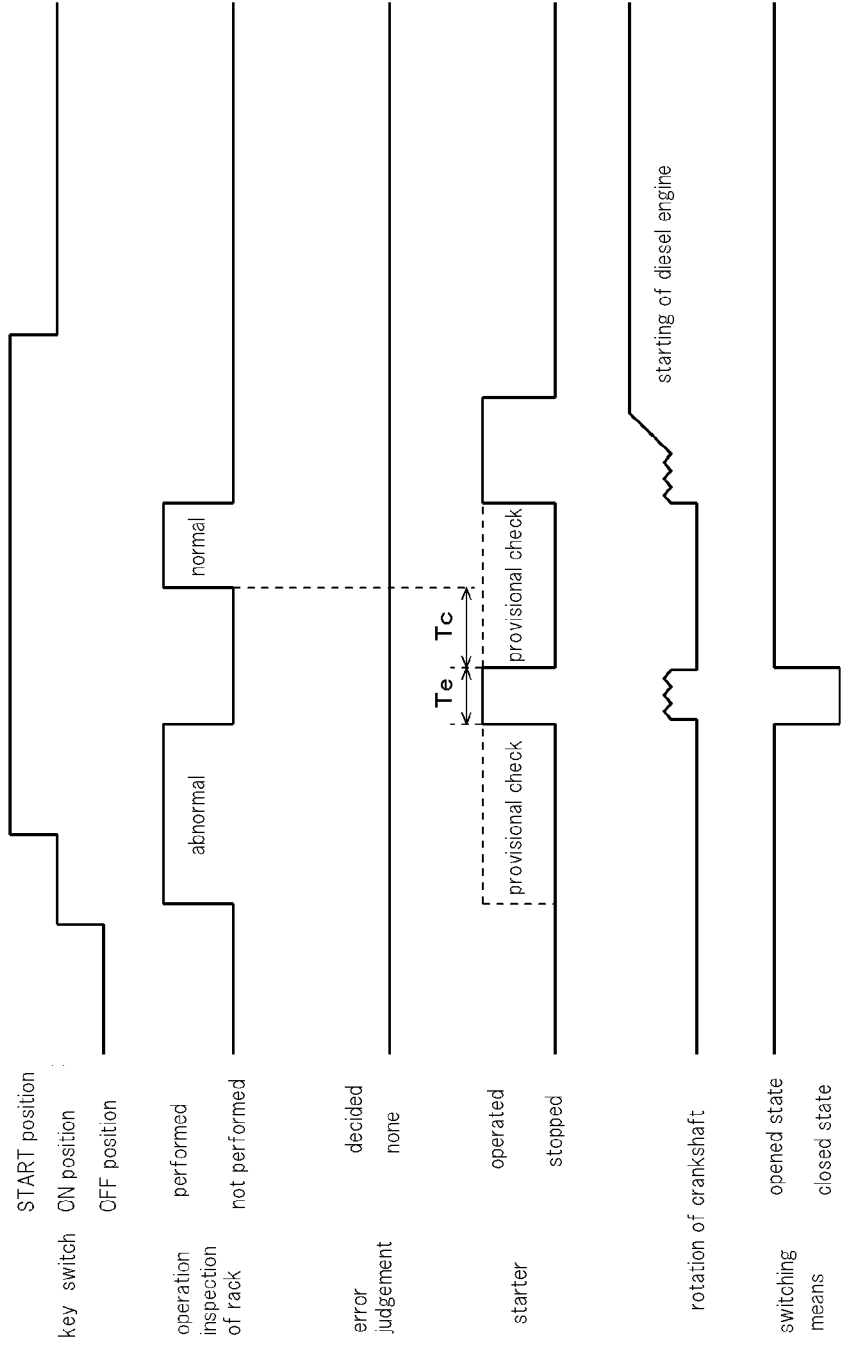
FIG. 17 is an example of a time chart of operation of the diesel engine corresponding to operation of the key switch.

As shown in FIG. 17, when the operation of the rack 45 is judged to be normal (step S33, normal), the control unit 70 shifts to the step S24.

When the operation of the rack 45 is judged to be abnormal (step S33, abnormal), the control unit 70 shifts to a step S34.

At the step S34, as shown in FIGS. 18 to 21, the control unit 70 performs error judgement and checks starting of the diesel engine 2 by the starter 60 (regular check). Namely, the control unit 70 makes the starter 60 not be operated even if the key switch 80 is operated to the START position.

At a step S35, after the control unit 70 performs the regular check, when the key switch 80 is operated to the OFF position (step S35, Yes), the control shifts to a step S36.

At the step S35, after the control unit 70 performs the regular check, when the key switch 80 is held at the ON position or the START position (step S35, No), the error judgement and the regular check are held.

Figure 21:
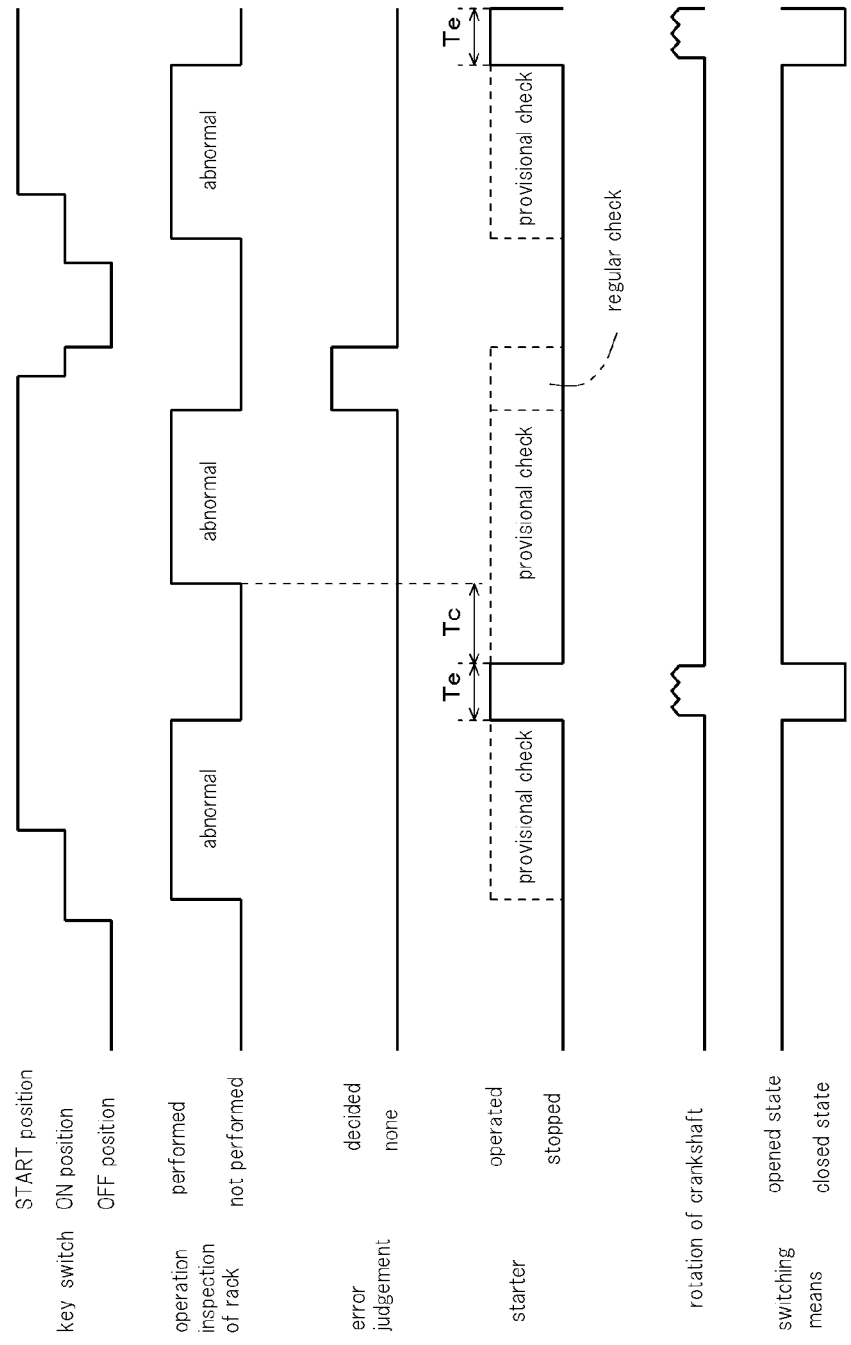
FIG. 21 is an example of a time chart of operation of the diesel engine corresponding to operation of the key switch.

At the step S35, as shown in FIG. 21, when the key switch 80 is operated to the OFF position, the regular check and the error judgement are released. Accordingly, after that, when the key switch 80 is operated from the OFF position to the ON position, the control starts from the step S21.

As shown in FIG. 22, when the key switch 80 is operated to the OFF position while the processes shown in the steps S21 to S34 are performed, the processes are interrupted. Subsequently, when the key switch 80 is operated from the OFF position to the ON position, the control starts from the step S21.

FIGS. 16 to 22 are time charts of the operation of the diesel engine 2 corresponding to the operation of the key switch 80.

As shown in FIG. 16, the control unit 70 judges that the first rack operation inspection is normal, and starts the diesel engine 2.

Figure 15:
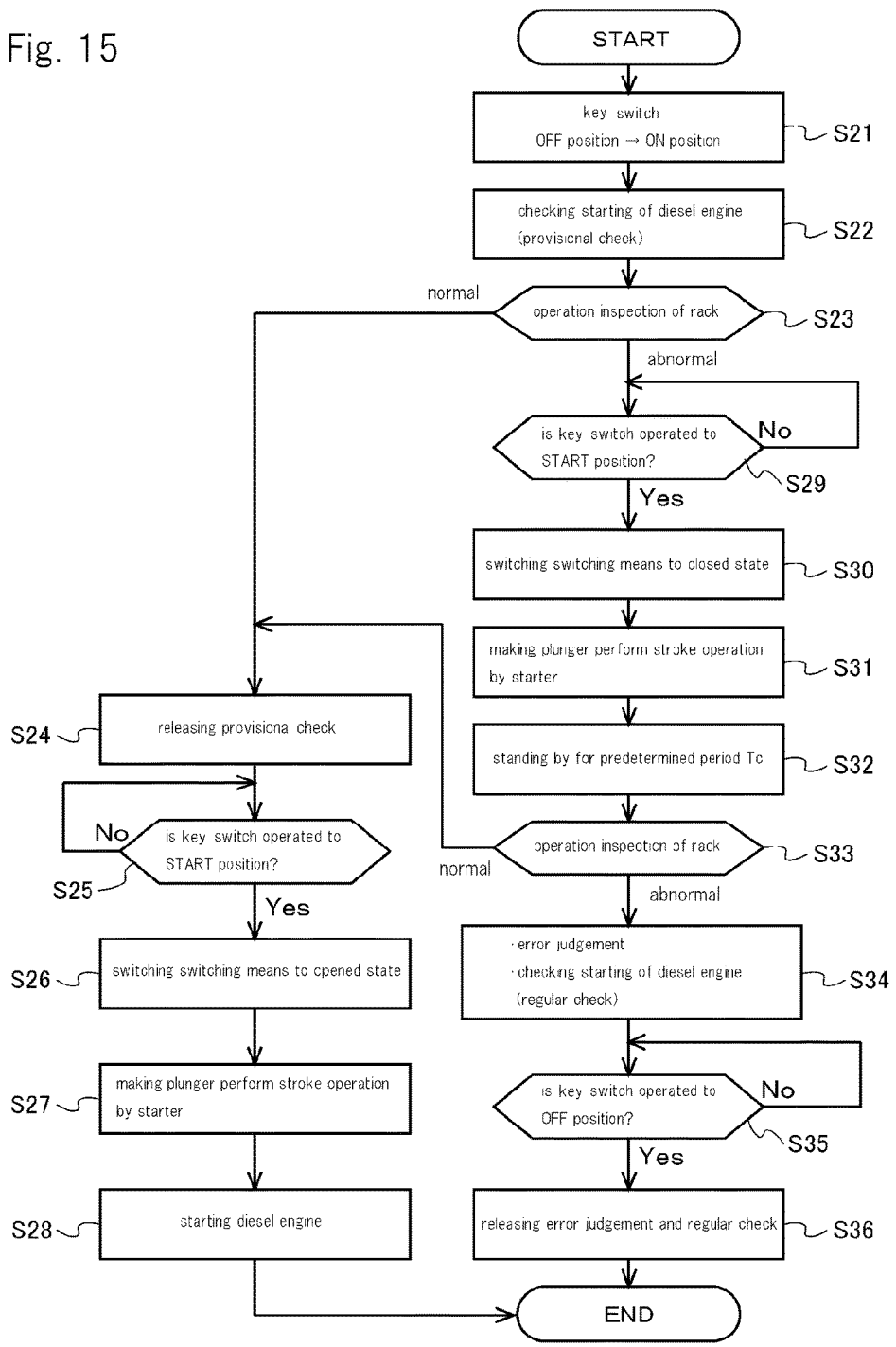
FIG. 15 is a flow chart of operation of the diesel engine.

FIG. 16 shows a time chart of the operation of the diesel engine 2 when the steps shifts to the step S21, the step S22, the step S23, the step S24, the step S25, the step S26, the step S27 and the step S28 in this order in the flow chart (see FIG. 15).

As shown in FIG. 17, the control unit 70 judges that the first rack operation inspection is abnormal and the second rack operation inspection is normal, and starts the diesel engine 2.

FIG. 17 shows a time chart of the operation of the diesel engine 2 when the steps shifts to the step S21, the step S22, the step S23, the step S29, the step S30, the step S31, the step S32, the step S33, the step S24, the step S25, the step S26, the step S27 and the step S28 in this order in the flow chart (see FIG. 15).

Figure 18:
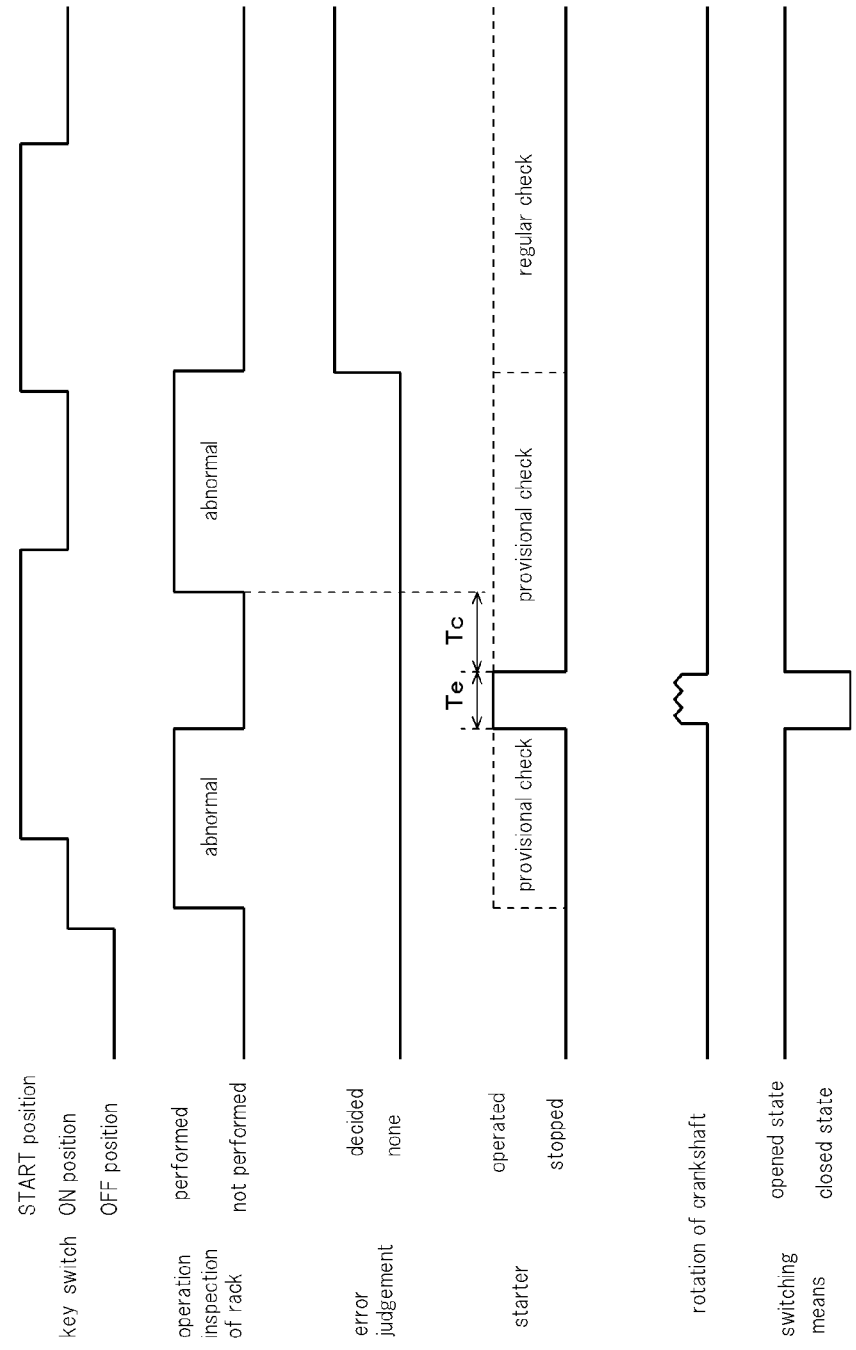
FIG. 18 is an example of a time chart of operation of the diesel engine corresponding to operation of the key switch.

As shown in FIG. 18, the control unit 70 performs the rack operation inspection twice and judges that each inspection is abnormal, and performs the regular check.

FIG. 18 shows a time chart of the operation of the diesel engine 2 when the steps shifts to the step S21, the step S22, the step S23, the step S29, the step S30, the step S31, the step S32, the step S33 and the step S34 in this order in the flow chart (see FIG. 15).

As shown in FIG. 19, the control unit 70 performs the rack operation inspection twice and judges that each inspection is abnormal, and performs the regular check.

FIG. 19 shows a time chart of the operation of the diesel engine 2 when the steps shifts to the step S21, the step S22, the step S23, the step S29, the step S30, the step S31, the step S32, the step S33 and the step S34 in this order in the flow chart (see FIG. 15).

As shown in FIG. 20, the control unit 70 performs the rack operation inspection twice and judges that each inspection is abnormal, and performs the regular check.

FIG. 20 shows a time chart of the operation of the diesel engine 2 when the steps shifts to the step S21, the step S22, the step S23, the step S29, the step S30, the step S31, the step S32, the step S33 and the step S34 in this order in the flow chart (see FIG. 15).

As shown in FIG. 21, the control unit 70 performs the rack operation inspection twice and judges that each inspection is abnormal, and performs the regular check. Then, since the key switch 80 is operated to the OFF position, the control unit 70 releases the regular check. Subsequently, since the key switch 80 is operated to the ON position, the control unit 70 redoes from the step S21.

FIG. 21 shows a time chart of the operation of the diesel engine 2 when the steps shifts to the step S21, the step S22, the step S23, the step S29, the step S30, the step S31, the step S32, the step S33, the step S34, the step S35, the step S36, the step S21, the step S22, the step S23, the step S29, the step S30 and the step S31 in this order in the flow chart (see FIG. 15).

As shown in FIG. 22, the control unit 70 judges that the first rack operation inspection is abnormal. Then, since the key switch 80 is operated to the OFF position in the midst of the second rack operation inspection, the control unit 70 interrupts the second rack operation inspection. Subsequently, since the key switch 80 is operated to the ON position, the control unit 70 redoes from the step S21.

FIG. 22 shows a time chart of the operation of the diesel engine 2 when the steps shifts to the step S21, the step S22, the step S23, the step S29, the step S30, the step S31, the step S32, the step S33, the step S21, the step S22, the step S23, the step S29, the step S30, the step S31, the step S32 and the step S33 in this order in the flow chart (see FIG. 15).

According to the above configuration, even if the operation inspection of the rack 45 is judged to be abnormal at the step S23, the shutoff valve 65 is switched to the closed state at the step S30 so that fuel cannot be supplied from the fuel injection pump 30 into the combustion chamber 17, whereby the fuel is not supplied into the combustion chamber 17 even if the starter 60 is operated as shown in the step S31. Accordingly, the starter 60 can be operated without starting the diesel engine 2.

Even if the plunger 34 is adhered by a film of fuel or the like formed on the outer perimeter of the plunger 34 and the plunger 34 is hardly to be rotated and as a result the operation of the rack 45 is judged to be abnormal by the control unit 70 at the step S23, the control unit 70 makes the plunger 34 perform the stroke operation by the starter 60 while the shutoff valve 65 is switched to the closed state so as to remove the film of fuel or the like as shown in the steps S30 and S31. Accordingly, the diesel engine 2 can be started smoothly.

As shown in FIGS. 18 to 21, in this embodiment, the control unit 70 can perform the operation inspection of the rack 45 up to twice before performing the regular check (error judgement). However, the present invention is not limited thereto, and the control unit 70 may perform the operation inspection of the rack 45 two or more times before performing the regular check.

Namely, when the rack 45 cannot finish the predetermined operation X for the predetermined period Ta until the control unit 70 repeats by turns the operation inspection of the rack 45 (the process in which the rack 45 is made perform the predetermined operation X by the actuator 48) and the process in which the plunger 34 is made perform the preliminary stroke operation by the starter 60 (see the steps S30 and S31) for a predetermined number of times N, the control unit 70 checks the starting of the diesel engine 2 by the starter 60 (regular check). The predetermined number of times N can be set freely by an operator or the like.

For example, in the case in which the control unit 70 can perform the operation inspection of the rack 45 for three times before the regular check, when the regular check is performed, the control unit 70 performs the operation inspection of the rack 45 (first time), the abnormality judgement, the stroke process, the operation inspection of the rack 45 (second time), the abnormality judgement, the stroke process, the operation inspection of the rack 45 (third time), the abnormality judgement, and the regular check in this order.

As shown in FIGS. 16 to 22, the shutoff valve 65 is normally in the opened state and switched to the closed state when the predetermined conditions are satisfied as shown in the step S30. However, the present invention is not limited thereto, and the shutoff valve 65 may alternatively be configured to be normally in the closed state and switched to the opened state when the predetermined conditions are satisfied as shown in the step S26.

Instead of the shutoff valve 65, a shutoff valve 66a and a return pipe 66b may alternatively be used.

Figure 23:
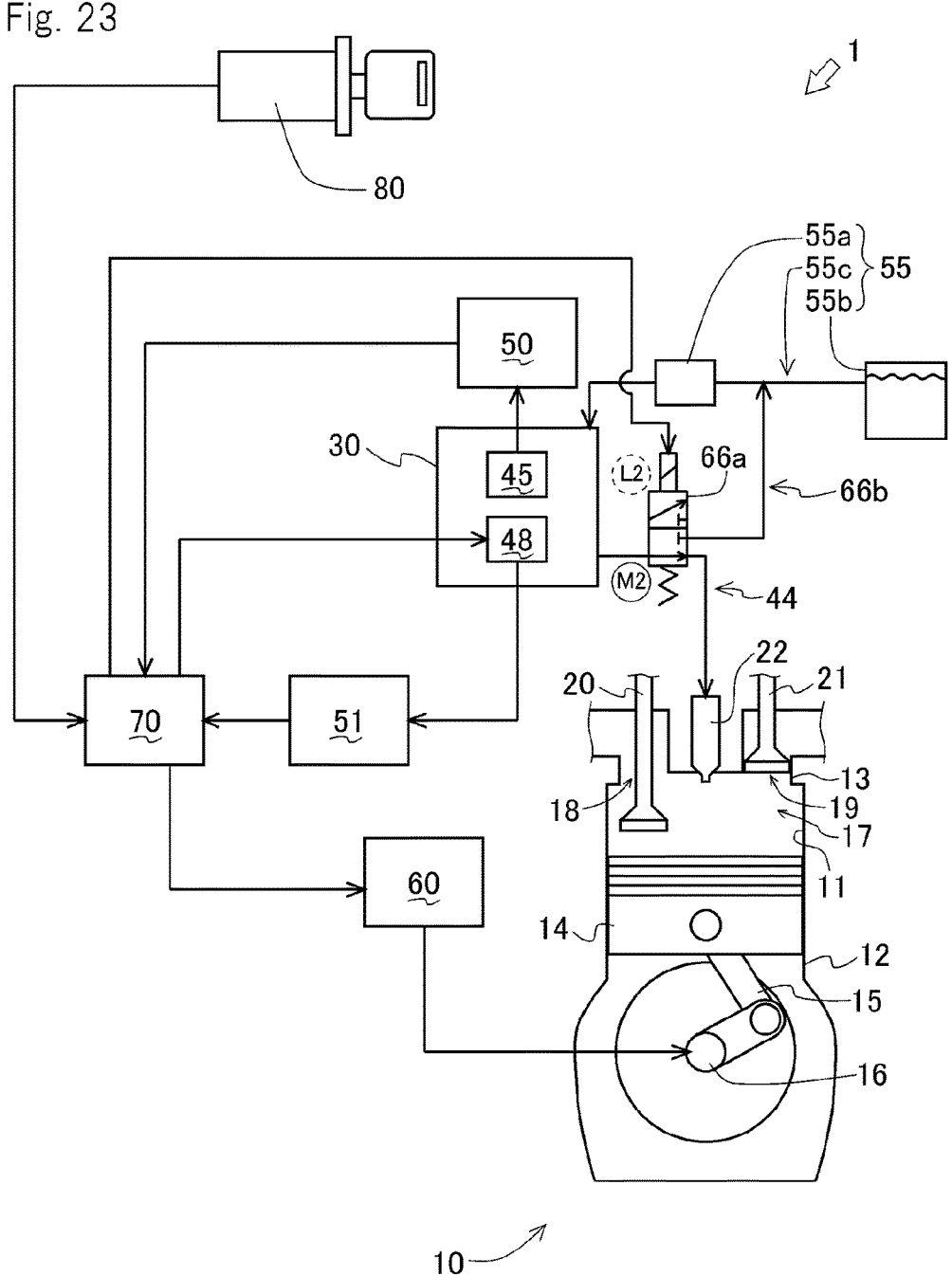
FIG. 23 is a drawing of a schematic configuration of a modification of the diesel engine of the second embodiment.

As shown in FIG. 23, the shutoff valve 66a switches passages of fuel. The shutoff valve 66a is configured by an electromagnetic valve, and can be switched to a position L2 or a position M2 by sliding a spool. The shutoff valve 66a is provided in the middle of the injection pipe 44.

One of ends of the return pipe 66b is connected to the shutoff valve 66a, and the other end is connected to the fuel supply part 55 (the fuel supply pipe 55c). The other end of the return pipe 66b may alternatively be connected to the fuel tank 55b or a suction side of the pump 55a.

When the spool is at the position L2 (closed state), the shutoff valve 66a shuts off the communication of the fuel injection pump 30 and the combustion chamber 17 and communicates the injection pipe 44 with the return pipe 66b. As a result, fuel injected from the fuel injection pump 30 is returned via the return pipe 66b to the fuel supply part 55 (the fuel supply pipe 55c), whereby fuel cannot be supplied from the fuel injection pump 30 into the combustion chamber 17.

When the spool is at the position M2 (opened state), the shutoff valve 66a communicates the fuel injection pump 30 with the combustion chamber 17 by the injection pipe 44 and shuts off the communication of the injection pipe 44 and the return pipe 66b. As a result, fuel injected from the fuel injection pump 30 is supplied via the injection pipe 44 into the combustion chamber 17 without flowing into the return pipe 66b, whereby fuel can be supplied from the fuel injection pump 30 into the combustion chamber 17.

In this embodiment, the shutoff valve 66a is configured by the electromagnetic valve. However, the present invention is not limited thereto, and another member which can switch the passages of fuel may alternatively be used.

Third Embodiment

A diesel engine 3 which is a third embodiment of the diesel engine of the present invention is explained.

In below explanation, differences from the diesel engine 1 are focused, and the same configurations as the diesel engine 1 are designated by the same reference numerals and detailed explanations thereof are omitted.

Figure 24:
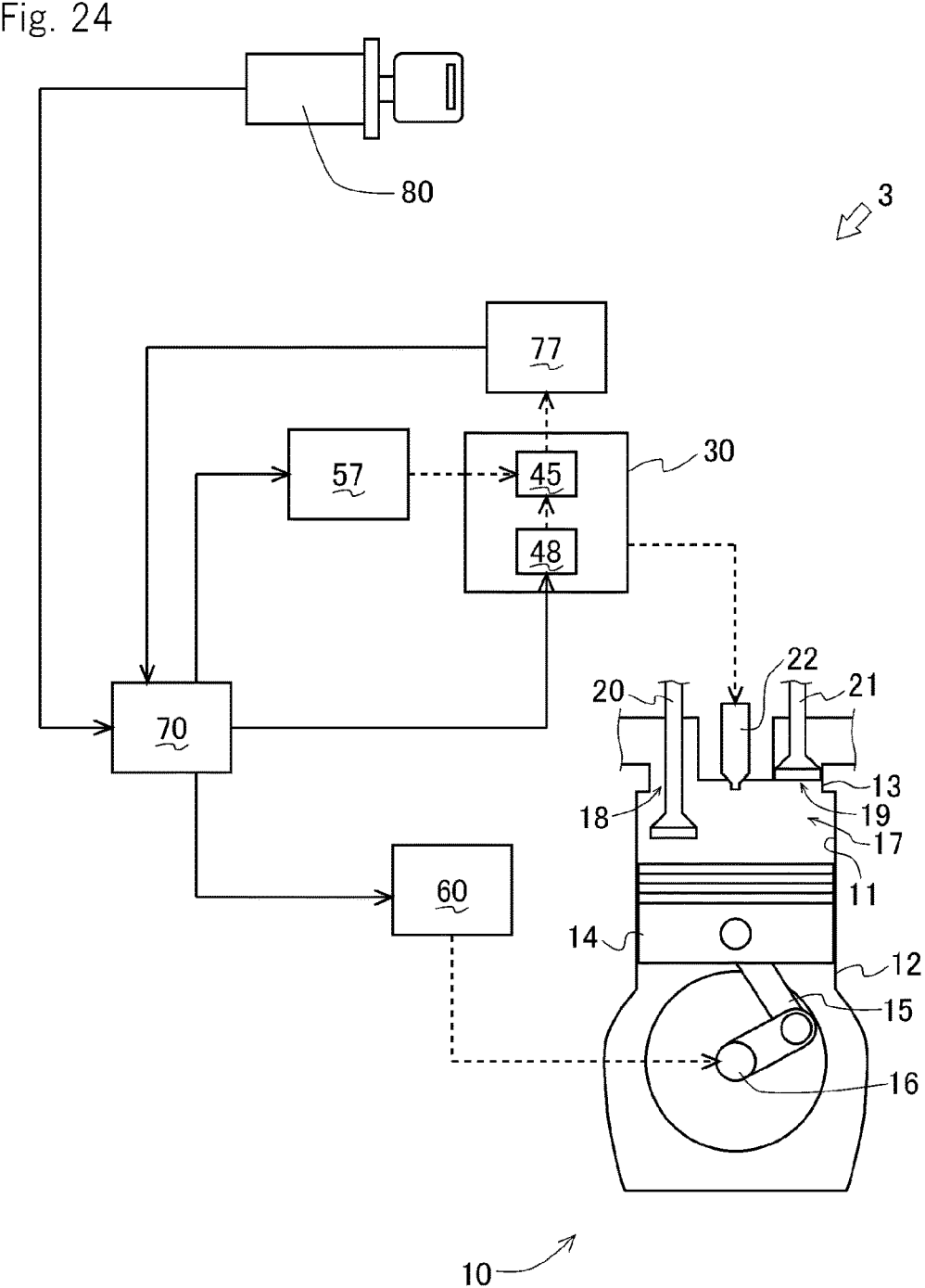
FIG. 24 is a drawing of a schematic configuration of a diesel engine of a third embodiment.

As shown in FIG. 24, the diesel engine 3 has the engine body 10, the fuel injection pump 30, a sub actuator 57, the starter 60 and the control unit 70.

The fuel injection pump 30 supplies fuel to the fuel injection nozzle 22.

Figure 25:
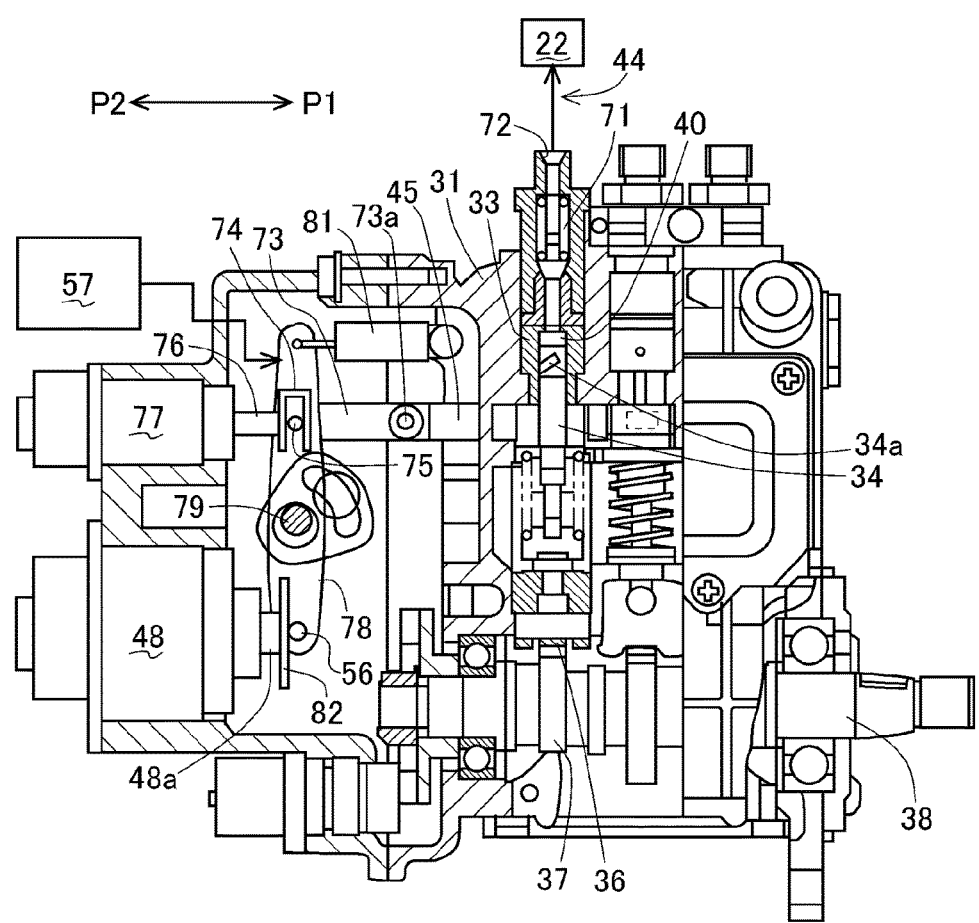
FIG. 25 is a sectional view of the fuel injection pump.

As shown in FIG. 25, the fuel injection pump 30 has the hydraulic head 31. The plunger barrel 33 is inserted into the hydraulic head 31, and the plunger 34 is arranged slidably vertically in the plunger barrel 33. In the outer peripheral surface of the plunger 34, the plunger lead 34a is formed. The plunger lead 34a is a spiral groove. Below the plunger 34, the roller-like tappet 36 is pivoted rotatably. The cam 37 contacts the tappet 36. The cam 37 is fixed to a camshaft 38. The camshaft 38 is connected via a gear (not shown) to the crankshaft 16 of the engine body 10. The camshaft 38 (the cam 37) is rotated following rotation of the crankshaft 16, and as a result, the plunger 34 is stroked vertically.

When the plunger 34 moves to the lowest position in the vertical movable range (bottom dead center), the fuel pressure chamber 40 formed above the plunger 34 in the plunger barrel 33 is communicated with a main port (not shown), and the fuel is introduced into the fuel pressure chamber 40.

On the other hand, when the plunger 34 is pushed up by the cam 37 and raised, a communication port of the main port to the fuel pressure chamber 40 is closed by the outer wall of the plunger 34.

As a result, fuel in the fuel pressure chamber 40 is pressurized following rising of the plunger 34, and opens a valve 71 above the plunger 34 and is injected from an injection port 72. The fuel injected from the injection port 72 passes through the injection pipe 44 and is injected from the fuel injection nozzle 22 of the engine body 10 so as to be supplied into the combustion chamber 17.

When the plunger 34 is raised further, the plunger lead 34a formed in the plunger 34 is communicated with the main port, and the inside of the plunger barrel 33 is communicated with the main port.

As a result, fuel in the plunger barrel 33 flows reversely to the main port. Namely, fuel injection by the fuel injection pump 30 is stopped.

As shown in FIG. 25, a gear (not shown) is formed in the outer peripheral surface of the plunger 34 and is meshed with the rack 45. The rack 45 is supported movably reciprocally along the lateral direction of FIG. 25. In this embodiment, the rack 45 is supported movably reciprocally between the end positions P1 and P2. At a tip of the rack 45, a connection link 73 is connected rotatably by a pin 73a. At a tip of the connection link 73, a reversed U-like engagement member 74 is connected by a pin 75. A sensing rod 76 is attached to the reversed U-like engagement member 74. The sensing rod 76 is slid together with the rack 45. At a tip of the sensing rod 76, a position detection device 77 detecting a position of the rack 45 is connected. The position detection device 77 detects a sliding amount of the sensing rod 76 so as to detect the position of the rack 45.

An interlocking lever 78 is supported rotatably at its vertical middle part by a fulcrum pin 79. A return spring 81 is attached to an upper end of the interlocking lever 78, and the interlocking lever 78 is biased to be rotated clockwise in FIG. 25 by the return spring 81.

The pin 75 is attached to a middle part of the interlocking lever 78 so that the interlocking lever 78 and the rack 45 are connected via the connection link 73 so as to be interlocked with each other.

By moving the sliding shaft 48a reciprocally, the actuator (electromagnetic solenoid) 48 moves the rack 45 reciprocally via a link mechanism (the interlocking lever 78, the connection link 73 and the like). A contact plate 82 is attached to a tip of the sliding shaft 48a of the actuator 48, and a connection pin 56 contacts the contact plate 82. The connection pin 56 is fixed to a lower end of the interlocking lever 78.

When the sliding shaft 48a of the actuator 48 is projected rightward in FIG. 25, the interlocking lever 78 is rotated counterclockwise via the contact plate 82 and the connection pin 56 oppositely to biasing power of the return spring 81. Following it, the rack 45 is slid leftward in FIG. 25 (toward the end position P2) via the connection link 73. On the other hand, when the sliding shaft 48a is contracted, the interlocking lever 78 is rotated clockwise by elastic power of the return spring 81 so that the rack 45 is slid rightward in FIG. 25 (toward the end position P1). When the actuator 48 is not energized, the rack 45 exists at the end position P1 in the movable range P1 to P2.

Following reciprocal movement of the rack 45 by the actuator 48, the plunger 34 is rotated around its axis.

By changing the rotation position of the plunger 34 by the actuator 48, timing of communication of the plunger lead 34a with the main port 39 at the time of rising of the plunger 34 is changed. As a result, fuel injection amount of the fuel injection pump 30 is changed.

In this embodiment, the fuel injection amount is increased by sliding the rack 45 toward the end position P2, and the fuel injection amount is reduced by sliding the rack 45 toward the end position P1.

The sub actuator 57 generates power for moving the rack 45.

For example, the sub actuator 57 is configured by a pneumatic cylinder, a hydraulic cylinder or an electromagnetic solenoid. The maximum output of the sub actuator 57 is larger than the maximum output of the actuator 48. Accordingly, at the time of moving the rack 45, the sub actuator 57 can apply larger pushing power to the rack 45 than the actuator 48. The sub actuator 57 is connected to the link mechanism interposed between the actuator 48 and the rack 45 (for example, the interlocking lever 78, the connection link 73 and the like), and applies the pushing power via the link mechanism to the rack 45 (see FIG. 32).

Figure 33:
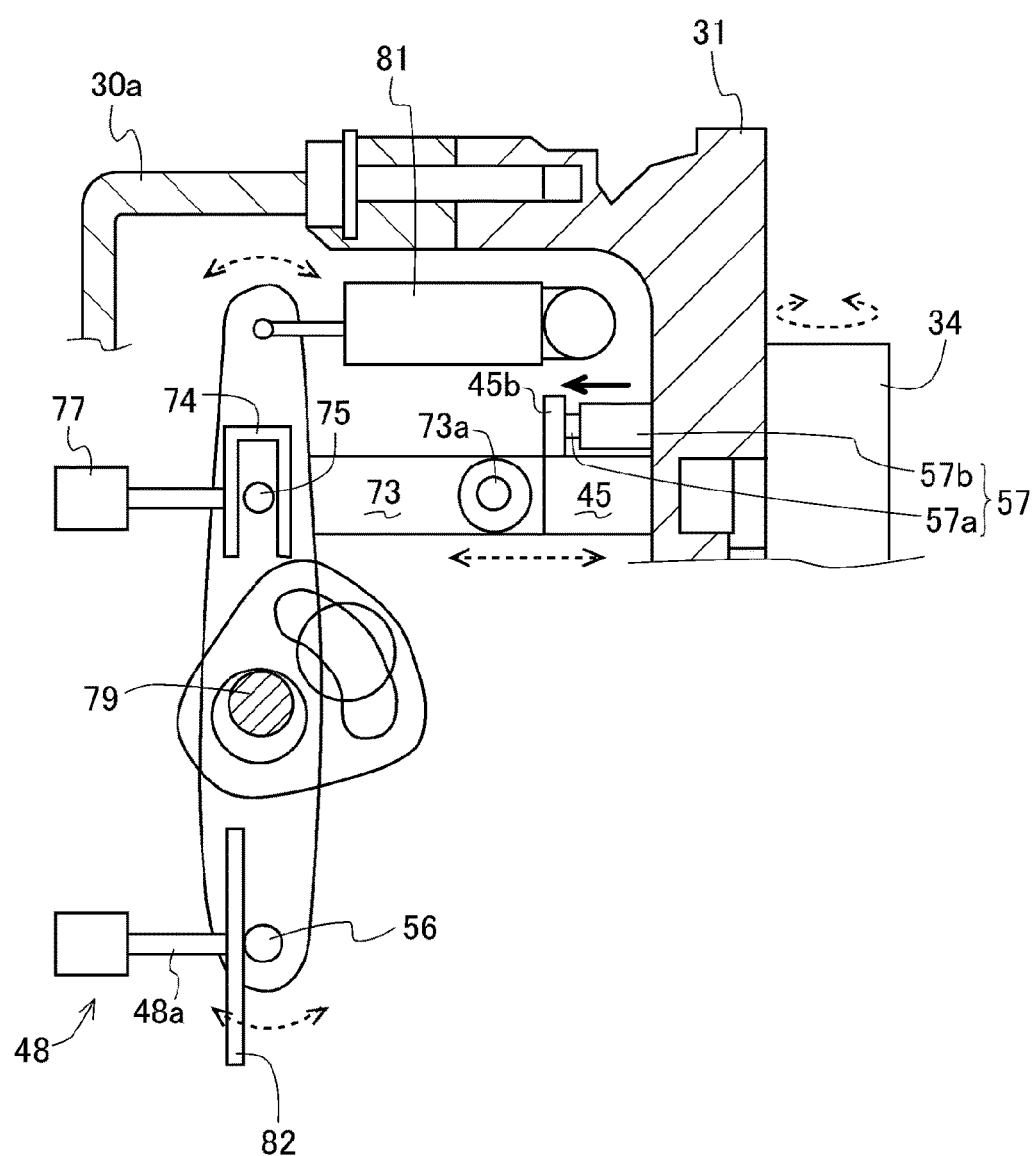
FIG. 33 is a schematic drawing of a second embodiment of the attachment structure of the sub actuator.

The sub actuator 57 may alternatively be connected to the rack 45 so that the sub actuator 57 applies the pushing power directly to the rack 45 (see FIG. 33). The sub actuator 57 may alternatively be connected to the actuator 48 so that the sub actuator 57 applies the pushing power to the rack 45 by pushing the actuator 48 (see FIG. 34).

An attachment structure of the sub actuator 57 is explained later.

The starter 60 starts the diesel engine 3.

As shown in FIG. 24, the starter 60 has an electric engine. The starter 60 is connected to the crankshaft 16 of the engine body 10 and can rotate the crankshaft 16. Following rotation of the crankshaft 16, the starter 60 can stroke vertically the plunger 34.

By rotating the crankshaft 16, the starter 60 starts the diesel engine 3. Start of the diesel engine 3 means the state that the intake stroke, the compression stroke, the expansion stroke and the exhaust stroke are realized sequentially while the starter 60 is stopped.

The control unit 70 controls the actuator 48 and the starter 60.

As shown in FIG. 24, the key switch 80 is connected to the control unit 70.

The key switch 80 is an operation instrument for starting and stopping the diesel engine 3. The key switch 80 can be shifted to the OFF position, the ON position or the START position. When the key switch 80 is operated to the OFF position, the starter 60 and the control unit 70 are not energized and stopped. When the key switch 80 is operated to the ON position, the actuator 48, the starter 60 and the control unit 70 are energized and can be operated. When the key switch 80 is operated from the ON position to the START position, the control unit 70 operates the starter 60 and executes various control programs for starting the diesel engine 3.

The control unit 70 is connected to the actuator 48 and can change the rotation position of the plunger 34 by operating the actuator 48 so as to change the position of the rack 45. By changing the rotation position of the plunger 34, the control unit 70 adjusts the fuel injection amount of the fuel injection pump 30.

The control unit 70 is connected to the sub actuator 57 and can control operation of the sub actuator 57.

The control unit 70 is connected to the starter 60 and can rotate the crankshaft 16 by operating the starter 60 so as to stroke the plunger 34. By operating the starter 60 so as to rotate the crankshaft 16, the control unit 70 can start the diesel engine 3.

The control unit 70 is connected to the position detection device 77 and can obtain information about a detection value of the position of the rack 45 from the position detection device 77.

Steps in the case in which the control unit 70 control the operations of the actuator 48, the sub actuator 57 and the starter 60 following the operation of the key switch 80 are explained referring to FIGS. 26 to 31.

At a step S41, the key switch 80 is operated from the OFF position to the ON position. Accordingly, the actuator 48, the sub actuator 57, the starter 60 and the control unit 70 are energized.

At a step S42, as shown in FIGS. 27 to 31, when the key switch 80 is operated from the OFF position to the ON position, the control unit 70 checks starting of the diesel engine 3 by the starter 60 (provisional check). Namely, the control unit 70 makes the starter 60 not be operated even if the key switch 80 is operated to the START position.

At a step S43, as shown in FIGS. 27 to 31, the control unit 70 performs operation inspection of the rack 45.

The operation inspection of the rack 45 is that the predetermined operation X is performed by the rack 45 and whether the rack 45 finishes the predetermined operation X for the predetermined period Ta or not is judged.

The predetermined operation X is movement of the rack 45 throughout the movable range P1 to P2. In this embodiment, the control unit 70 moves the rack 45 to the end position P1, the end position P2 and the end position P1 in this order.

The predetermined period Ta is a period of time required normally for finishing the predetermined operation X of the rack 45 when the rack 45 is operated normally following driving of the actuator 48. Information about the predetermined period Ta is stored previously in the control unit 70.

Figure 27:
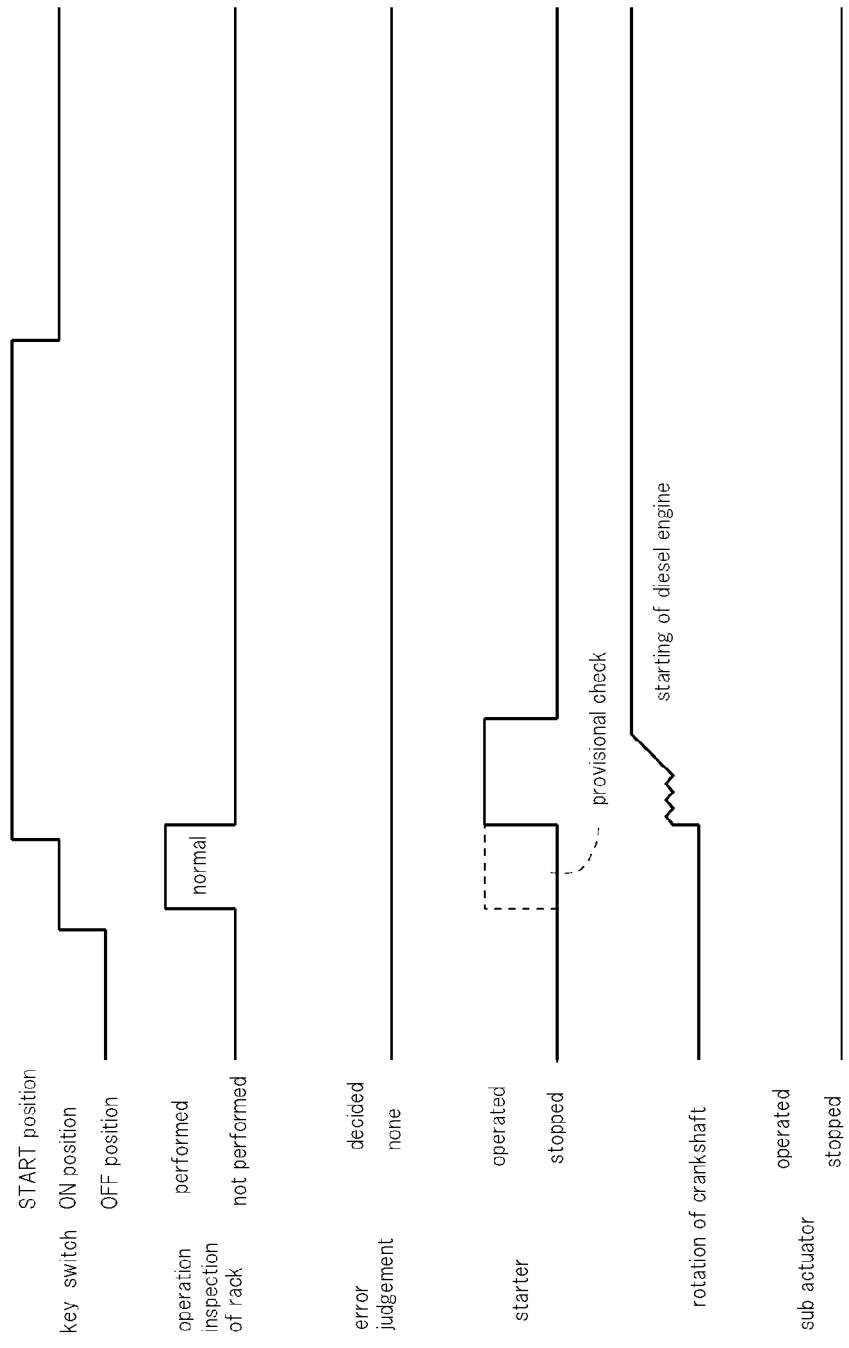
FIG. 27 is an example of a time chart of operation of the diesel engine corresponding to operation of the key switch.

As shown in FIG. 27, when the rack 45 finishes the predetermined operation X for the predetermined period Ta, the control unit 70 judges that the operation of the rack 45 is normal.

As shown in FIGS. 28 to 31, when the rack 45 does not finish the predetermined operation X for the predetermined period Ta, the control unit 70 judges that the operation of the rack 45 is abnormal.

When the operation of the rack 45 is judged to be normal (strep S43, normal), the control unit 70 shifts to a strep S44.

When the operation of the rack 45 is judged to abnormal normal (strep S43, abnormal), the control unit 70 shifts to a strep S47.

At the step S44, the control unit 70 releases the provisional check.

At a step S45, the control unit 70 judges whether the key switch 80 is operated to the START position or not.

When the key switch 80 is not operated to the START position and is at the ON position, the control unit 70 stands by until the key switch 80 is operated to the START position.

When the key switch 80 is operated to the START position, the control shifts to a step S46.

At the step S46, as shown in FIG. 27, the control unit 70 operates the starter 60 so as to start the diesel engine 3.

At the step S47, as shown in FIGS. 28 to 31, the control unit 70 moves the rack 45 by the sub actuator 57. At this time, the control unit 70 moves the rack 45 throughout the movable range P1 to P2. In this embodiment, the control unit 70 moves the rack 45 to the end position P1, the end position P2 and the end position P1 in this order. Strictly, the rack 45 is moved from to the end position P1 to the end position P2 by pushing power of the sub actuator 57, and the rack 45 is moved from to the end position P2 to the end position P1 by elastic power of the return spring 81.

At the step S47, the control unit 70 may alternatively move the rack 45 by both the actuator 48 and the sub actuator 57.

At a step S48, as shown in FIGS. 28 to 31, after moving the rack 45 by the sub actuator 57, the control unit 70 performs the operation inspection of the rack 45 again.

Figure 31:
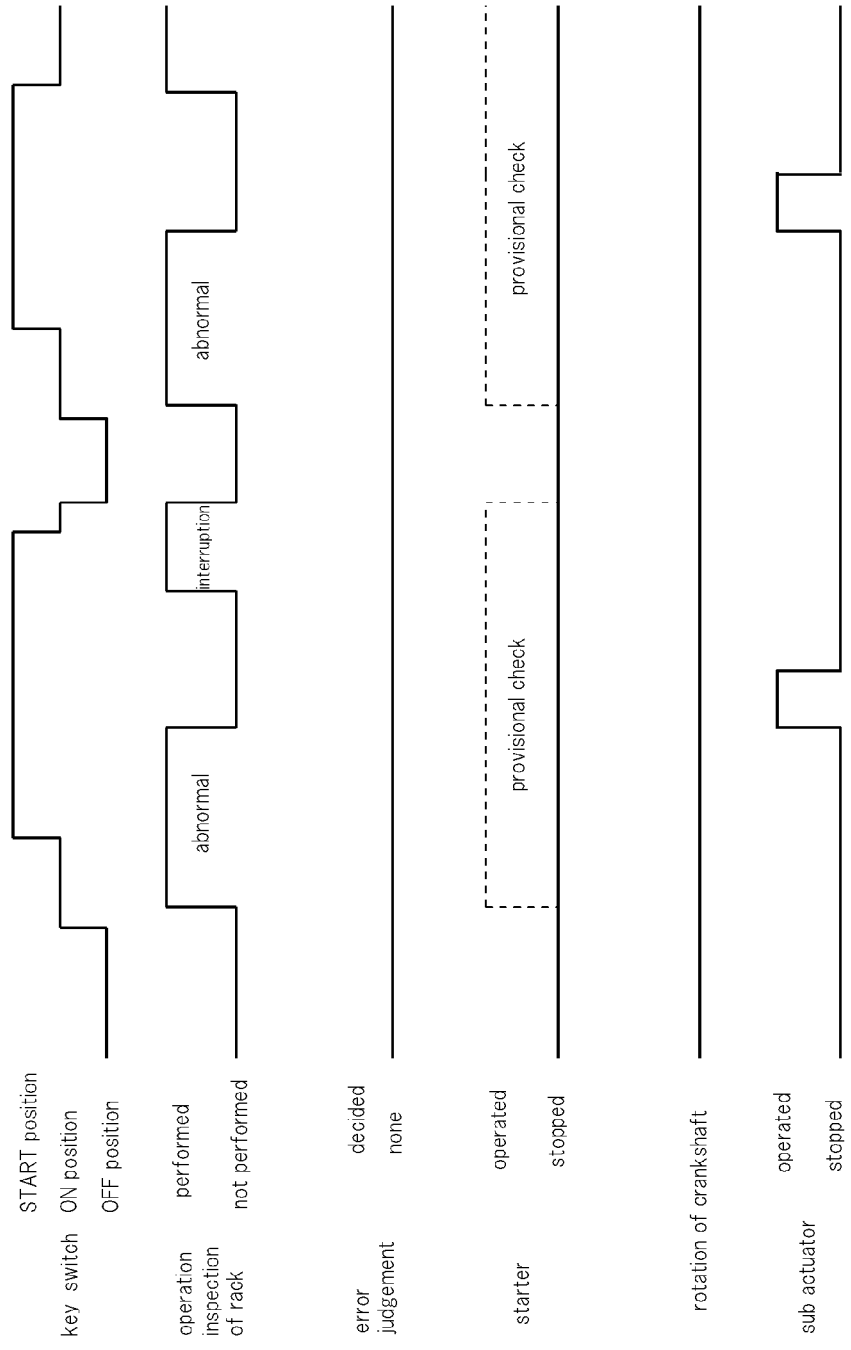
FIG. 31 is an example of a time chart of operation of the diesel engine corresponding to operation of the key switch.

On condition that the key switch 80 is held at the ON position or the START position, the control unit 70 can perform the operation inspection of the rack 45. Accordingly, as shown in FIG. 31, at the time of the operation inspection of the rack 45, when the key switch 80 is operated to the OFF position, the operation inspection of the rack 45 is interrupted.

Figure 28:
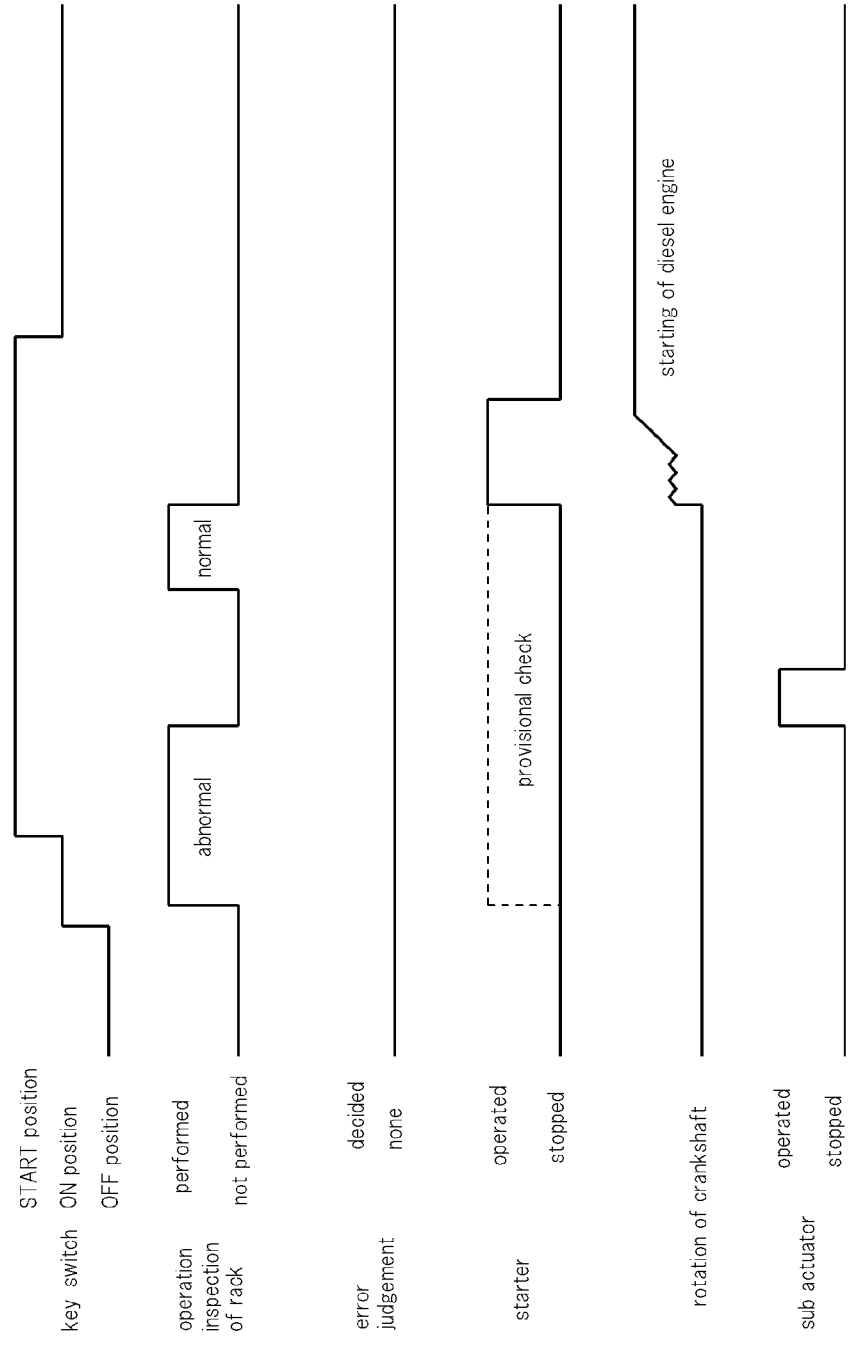
FIG. 28 is an example of a time chart of operation of the diesel engine corresponding to operation of the key switch.

As shown in FIG. 28, when the operation of the rack 45 is judged to be normal (step S48, normal), the control unit 70 shifts to the step S44.

When the operation of the rack 45 is judged to be abnormal (step S48, abnormal), the control unit 70 shifts to a step S49.

Figure 29:
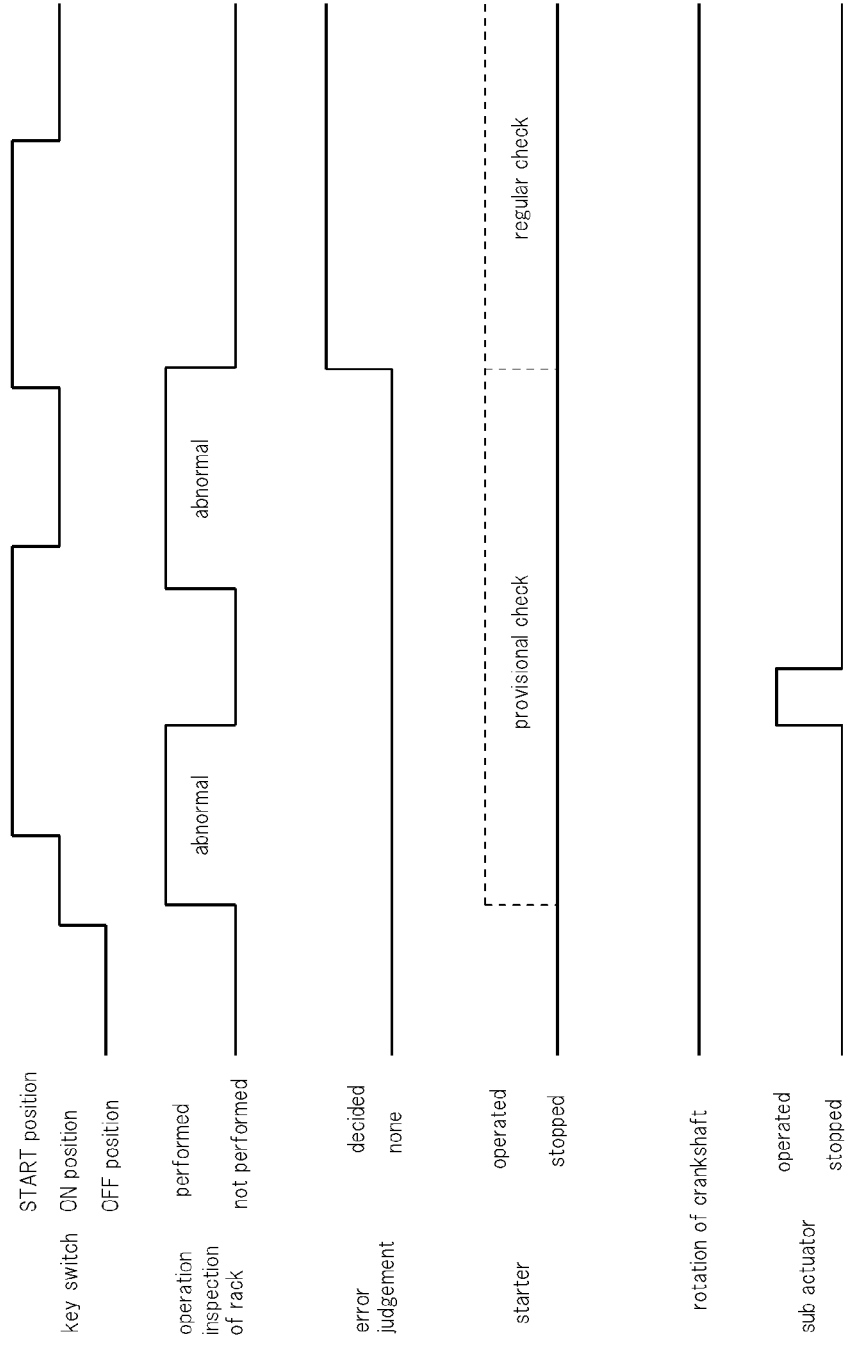
FIG. 29 is an example of a time chart of operation of the diesel engine corresponding to operation of the key switch.
Figure 30:
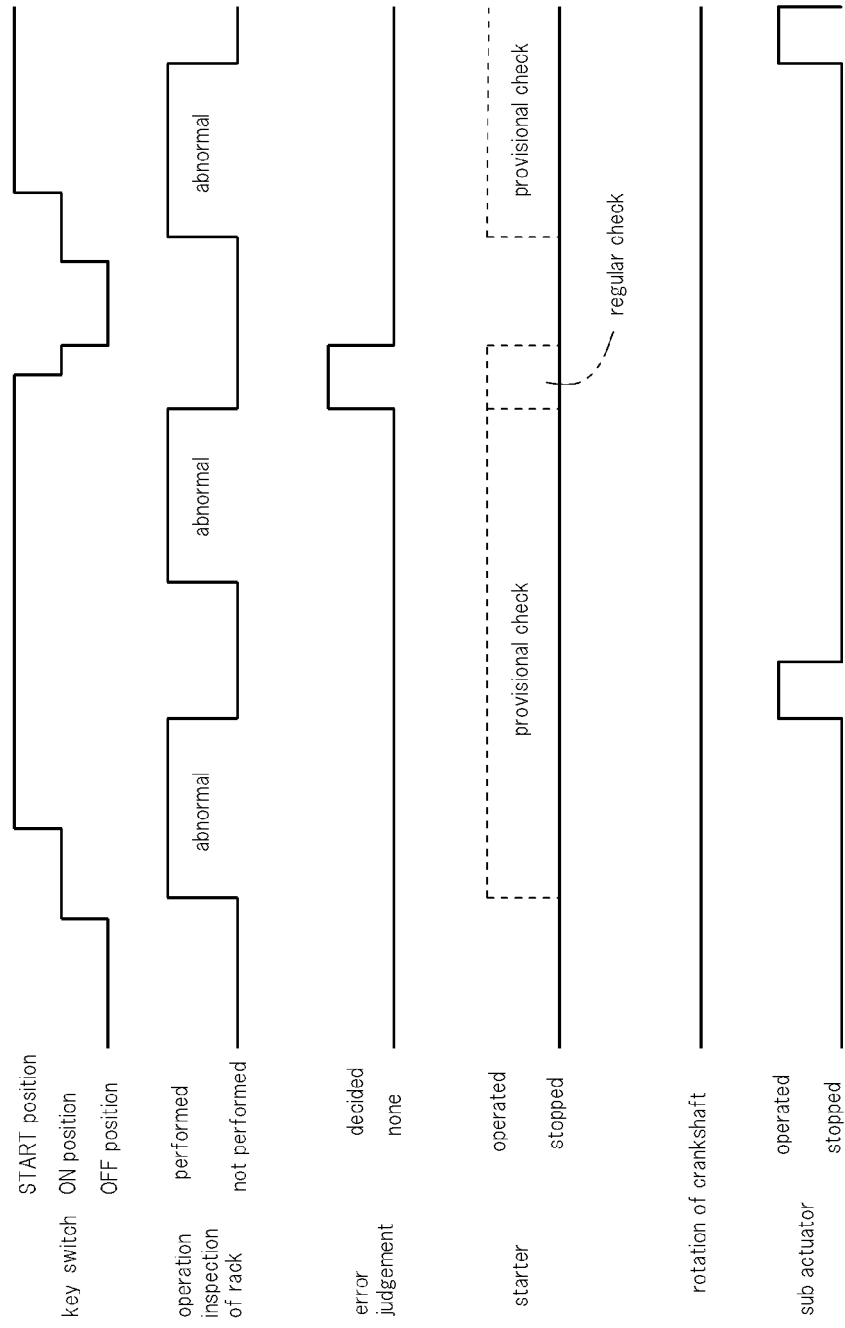
FIG. 30 is an example of a time chart of operation of the diesel engine corresponding to operation of the key switch.

At the step S49, as shown in FIGS. 29 and 30, the control unit 70 performs error judgement and checks starting of the diesel engine 3 by the starter 60 (regular check). Namely, the control unit 70 makes the starter 60 not be operated even if the key switch 80 is operated to the START position.

At a step S50, after the control unit 70 performs the regular check, when the key switch 80 is operated to the OFF position (step S50, Yes), the control shifts to a step S51.

At the step S50, after the control unit 70 performs the regular check, when the key switch 80 is held at the ON position or the START position (step S50, No), the error judgement and the regular check are held.

At the step S51, as shown in FIG. 30, when the key switch 80 is operated to the OFF position, the regular check and the error judgement are released. Accordingly, after that, when the key switch 80 is operated from the OFF position to the ON position, the control starts from the step S41.

As shown in FIG. 31, when the key switch 80 is operated to the OFF position while the processes shown in the steps S41 to S49 are performed, the processes are interrupted. Subsequently, when the key switch 80 is operated from the OFF position to the ON position, the control starts from the step S41.

FIGS. 27 to 31 are time charts of the operation of the diesel engine 3 corresponding to the operation of the key switch 80.

As shown in FIG. 27, the control unit 70 judges that the first rack operation inspection is normal, and starts the diesel engine 3.

Figure 26:
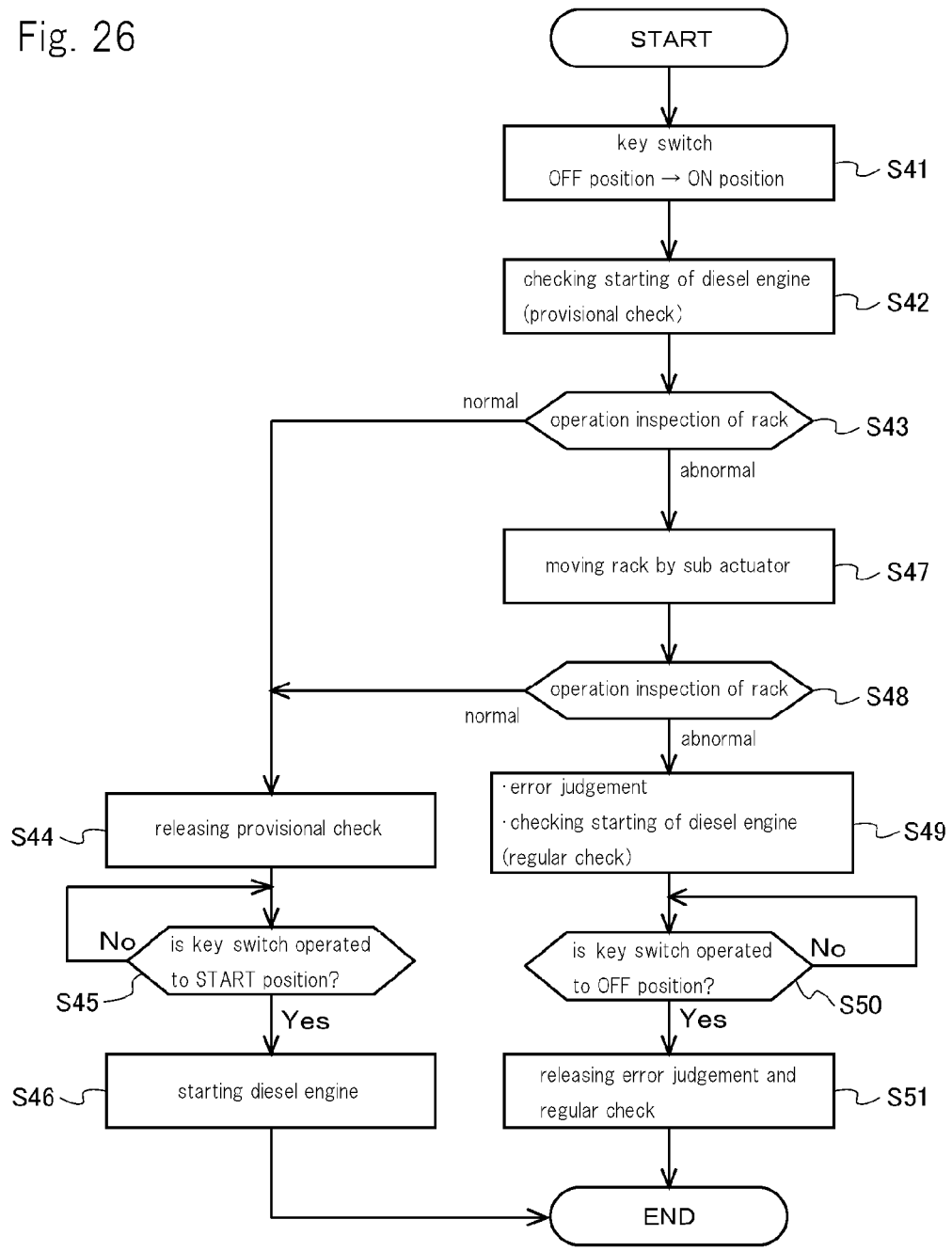
FIG. 26 is a flow chart of operation of the diesel engine.

FIG. 27 shows a time chart of the operation of the diesel engine 3 when the steps shifts to the step S41, the step S42, the step S43, the step S44, the step S45 and the step S46 in this order in the flow chart (see FIG. 26).

As shown in FIG. 28, the control unit 70 judges that the first rack operation inspection is abnormal and the second rack operation inspection is normal, and starts the diesel engine 3.

FIG. 28 shows a time chart of the operation of the diesel engine 3 when the steps shifts to the step S41, the step S42, the step S43, the step S47, the step S48, the step S44, the step S45 and the step S46 in this order in the flow chart (see FIG. 26).

As shown in FIG. 29, the control unit 70 performs the rack operation inspection twice and judges that each inspection is abnormal, and performs the regular check.

FIG. 29 shows a time chart of the operation of the diesel engine 3 when the steps shifts to the step S41, the step S42, the step S43, the step S47, the step S48 and the step S49 in this order in the flow chart (see FIG. 26).

As shown in FIG. 30, the control unit 70 performs the rack operation inspection twice and judges that each inspection is abnormal, and performs the regular check. Then, since the key switch 80 is operated to the OFF position, the control unit 70 releases the regular check. Subsequently, since the key switch 80 is operated to the ON position, the control unit 70 redoes from the step S41.

FIG. 30 shows a time chart of the operation of the diesel engine 3 when the steps shifts to the step S41, the step S42, the step S43, the step S47, the step S48, the step S49, the step S50, the step S51, the step S41, the step S42, the step S43 and the step S47 in this order in the flow chart (see FIG. 26).

As shown in FIG. 31, the control unit 70 judges that the first rack operation inspection is abnormal. Then, since the key switch 80 is operated to the OFF position in the midst of the second rack operation inspection, the control unit 70 interrupts the second rack operation inspection. Subsequently, since the key switch 80 is operated to the ON position, the control unit 70 redoes from the step S41.

FIG. 31 shows a time chart of the operation of the diesel engine 3 when the steps shifts to the step S41, the step S42, the step S43, the step S47, the step S48, the step S41, the step S42, the step S43, the step S47 and the step S48 in this order in the flow chart (see FIG. 26).

According to the above configuration, even if the plunger 34 is adhered by a film of fuel or the like formed on an outer perimeter of the plunger 34 and the plunger 34 is hardly to be rotated and as a result the operation of the rack 45 is judged to be abnormal by the control unit 70 at the step S43, the control unit 70 applies larger pushing power to the rack 45 by using the sub actuator 57 than using the actuator 48, whereby the rack 45 is moved and the plunger 34 is rotated so as to remove the film of fuel or the like as shown in the step S47. Accordingly, the diesel engine 3 can be started smoothly.

As shown in FIGS. 29 and 30, in this embodiment, the control unit 70 can perform the operation inspection of the rack 45 up to twice before performing the regular check (error judgement). However, the present invention is not limited thereto, and the control unit 70 may perform the operation inspection of the rack 45 two or more times before performing the regular check.

Namely, when the rack 45 cannot finish the predetermined operation X for the predetermined period Ta until the control unit 70 repeats by turns the operation inspection of the rack 45 (the process in which the rack 45 is made perform the predetermined operation X by the actuator 48) and the process in which the rack 45 is moved by the sub actuator 57 (see the step S47) for a predetermined number of times N, the control unit 70 checks the starting of the diesel engine 1 by the starter 60 (regular check). The predetermined number of times N can be set freely by an operator or the like.

For example, in the case in which the control unit 70 can perform the operation inspection of the rack 45 for three times before the regular check, when the regular check is performed, the control unit 70 performs the operation inspection of the rack 45 (first time), the abnormality judgement, the rack operation process, the operation inspection of the rack 45 (second time), the abnormality judgement, the rack operation process, the operation inspection of the rack 45 (third time), the abnormality judgement, and the regular check in this order.

A first embodiment of the attachment structure of the sub actuator 57 is explained below.

Figure 32:
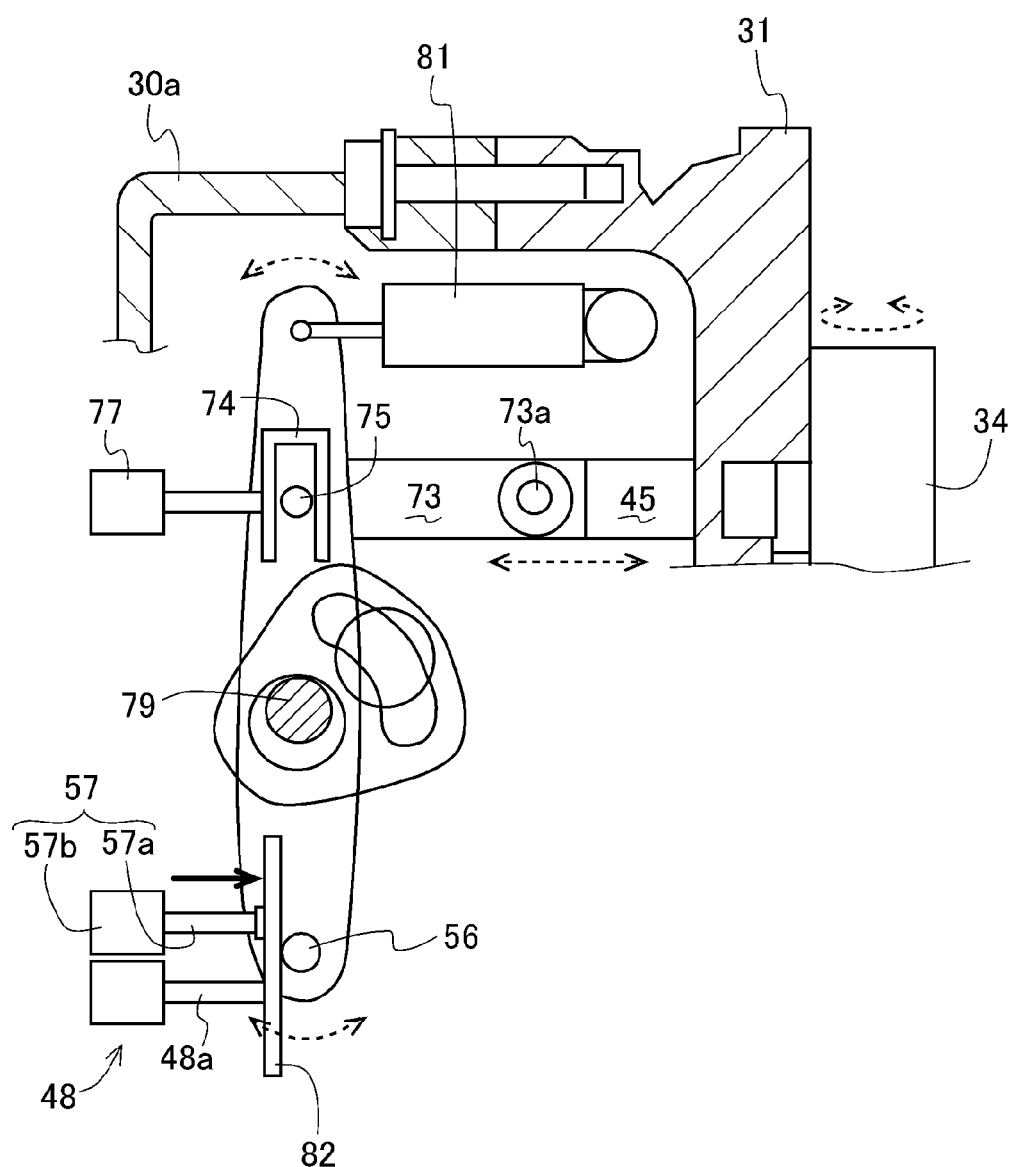
FIG. 32 is a schematic drawing of a first embodiment of an attachment structure of a sub actuator.

As shown in FIG. 32, the sub actuator 57 is connected via the link mechanism (the interlocking lever 78, the connection link 73 and the like) to the rack 45. The contact plate 82 is attached to a tip of a sliding shaft 57*a* of the sub actuator 57. A main body 57*b* of the sub actuator 57 is fixed to a casing 30*a* of the fuel injection pump 30.

At the step S47, the control unit 70 makes the sliding shaft 57a of the sub actuator 57 slide rightward in FIG. 32 so as to rotate the interlocking lever 78 counterclockwise, thereby moving the rack 45 leftward (from the end position P1 toward the end position P2).

A second embodiment of the attachment structure of the sub actuator 57 is explained below.

As shown in FIG. 33, the sub actuator 57 is connected to the rack 45. The main body 57b of the sub actuator 57 is fixed to an inner peripheral surface of the casing 30a of the fuel injection pump 30. The tip of the sliding shaft 57a of the sub actuator 57 is attached to a flange part 45b formed in an outer peripheral surface of the rack 45.

At the step S47, the control unit 70 makes the sliding shaft 57a of the sub actuator 57 slide leftward in FIG. 33 so as to move the rack 45 leftward (from the end position P1 toward the end position P2).

A third embodiment of the attachment structure of the sub actuator 57 is explained below.

Figure 34:
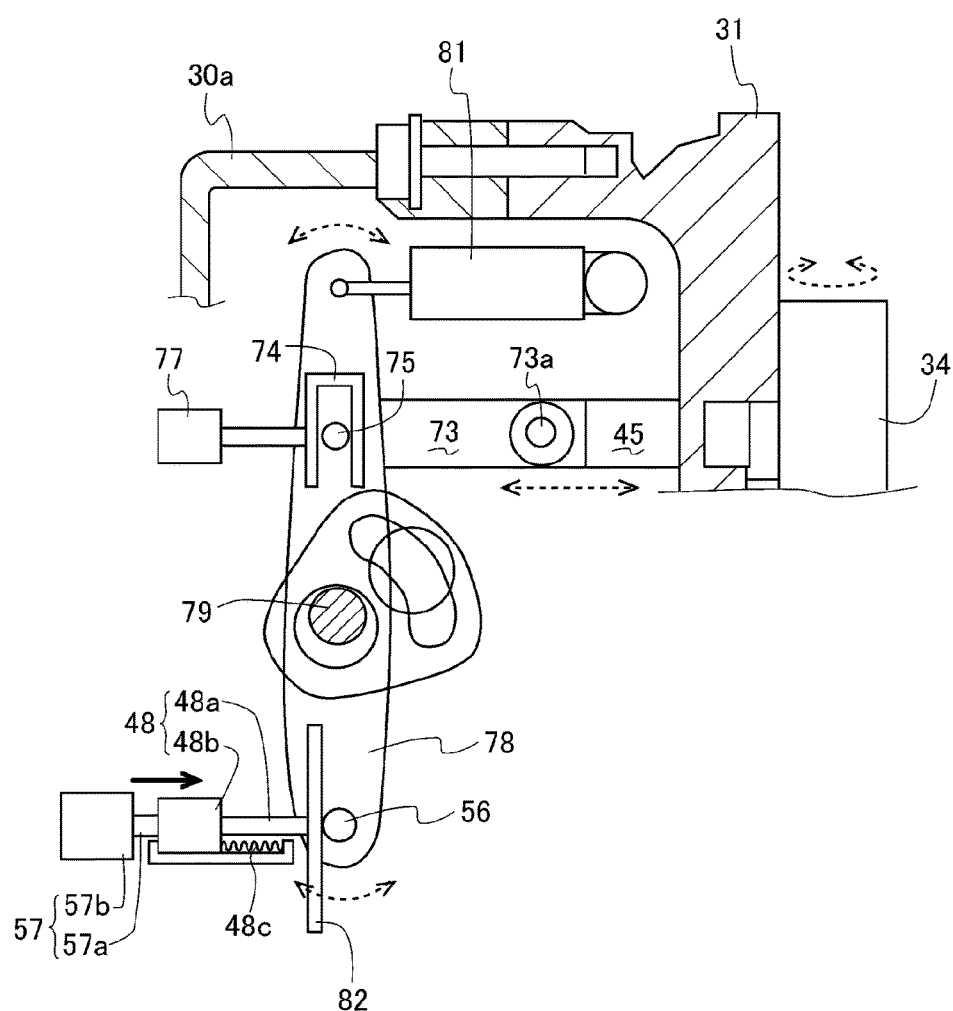
FIG. 34 is a schematic drawing of a third embodiment of the attachment structure of the sub actuator.

As shown in FIG. 34, the sub actuator 57 is connected to the actuator 48. The main body 57b of the sub actuator 57 is fixed to the casing 30a of the fuel injection pump 30. The tip of the sliding shaft 57a of the sub actuator 57 is attached to a main body 48b of the actuator 48. The main body 48b of the actuator 48 is biased leftward in FIG. 34 by an elastic member 48c. The contact plate 82 is attached to the tip of the sliding shaft 48a of the actuator 48.

At the step S47, the control unit 70 makes the sliding shaft 57a of the sub actuator 57 slide rightward in FIG. 34 so as to contract the elastic member 48c, thereby moving the whole actuator 48 rightward. As a result, the control unit 70 rotates the interlocking lever 78 counterclockwise so as to move the rack 45 leftward (from the end position P1 toward the end position P2).

INDUSTRIAL APPLICABILITY

The present invention can be used for a diesel engine.

DESCRIPTION OF NOTATIONS 1 diesel engine
30 fuel injection pump
34 plunger
45 rack
48 actuator
60 starter
70 control unit
80 key switch

The invention claimed is:

1. A diesel engine comprising:
a fuel injection pump whose fuel injection amount is adjusted by moving a rack to change a rotation position of a plunger;
an actuator for operating the rack;
a starter for making the plunger perform a stroke operation; and
a control unit for controlling the actuator and the starter following an operation of a key switch,
wherein the control unit makes the rack perform a predetermined operation by the actuator when the key switch is operated from an OFF position to an ON position, and if the rack cannot finish the predetermined operation within a predetermined period of time, while the key switch is being held at a START position the control unit makes the plunger perform a preliminary stroke operation by energizing the starter, which makes the plunger perform the stroke operation, after which the control unit stops the preliminary stroke operation of the plunger before starting the diesel engine.

2. The diesel engine according to claim 1, wherein after making the plunger perform the preliminary stroke operation by the starter, the control unit makes the rack perform the predetermined operation by the actuator again.

3. The diesel engine according to claim 2, wherein when the rack cannot finish the predetermined operation for the predetermined period of time while the control unit alternates between the process in which the rack is made to perform the predetermined operation by the actuator and the process in which the plunger is made to perform the preliminary stroke operation by the starter for a predetermined number of times, the control unit checks the starting of the diesel engine by the starter.

4. The diesel engine according to claim 3, wherein the control unit releases the check of the starting of the diesel engine by the starter when the key switch is operated from the ON position to the OFF position.

5. The diesel engine according to claim 3, further comprising:
a notice means which notifies an operator that the control unit checks the starting of the diesel engine by the starter.

6. The diesel engine according to claim 1, further comprising:
a position detection device detecting a position of the rack; and
an output value detection device detecting an output value of the actuator,
wherein at the time at which the actuator makes the rack to perform the predetermined operation, the control unit:
obtains information about a detection value of the position of the rack from the position detection device and obtains information about a detection value of the output value of the actuator from the output value detection device,
calculates a difference between the detection value of the position of the rack and a previously stored target position of the rack and corresponding to the output value of the actuator, and
judges that the rack cannot finish the predetermined operation for the predetermined period of time when the difference is not less than a predetermined value.

7. The diesel engine according to claim 2, further comprising:
a position detection device detecting a position of the rack; and
an output value detection device detecting an output value of the actuator,
wherein at the time at which the actuator makes the rack perform the predetermined operation, the control unit:
obtains information about a detection value of the position of the rack from the position detection device and obtains information about a detection value of the output value of the actuator from the output value detection device,
calculates a difference between the detection value of the position of the rack and a previously stored target position of the rack and corresponding to the output value of the actuator, and
judges that the rack cannot finish the predetermined operation for the predetermined period of time when the difference is not less than a predetermined value.

8. The diesel engine according to claim 3, further comprising:
- a position detection device detecting a position of the rack; and
- an output value detection device detecting an output value of the actuator,
- wherein at the time at which the actuator makes the rack perform the predetermined operation, the control unit:
  - obtains information about a detection value of the position of the rack from the position detection device and obtains information about a detection value of the output value of the actuator from the output value detection device,
  - calculates a difference between the detection value of the position of the rack and a previously stored target position of the rack and corresponding to the output value of the actuator, and
  - judges that the rack cannot finish the predetermined operation for the predetermined period of time when the difference is not less than a predetermined value.

9. The diesel engine according to claim 4, further comprising:
- a position detection device detecting a position of the rack; and
- an output value detection device detecting an output value of the actuator,
- wherein at the time at which the actuator makes the rack perform the predetermined operation, the control unit:
  - obtains information about a detection value of the position of the rack from the position detection device and obtains information about a detection value of the output value of the actuator from the output value detection device,
  - calculates a difference between the detection value of the position of the rack and a previously stored target position of the rack and corresponding to the output value of the actuator, and
  - judges that the rack cannot finish the predetermined operation for the predetermined period of time when the difference is not less than a predetermined value.

10. The diesel engine according to claim 5, further comprising:
- a position detection device detecting a position of the rack; and
- an output value detection device detecting an output value of the actuator,
- wherein at the time at which the actuator makes the rack perform the predetermined operation, the control unit:
  - obtains information about a detection value of the position of the rack from the position detection device and obtains information about a detection value of the output value of the actuator from the output value detection device,
  - calculates a difference between the detection value of the position of the rack and a previously stored target position of the rack and corresponding to the output value of the actuator, and
  - judges that the rack cannot finish the predetermined operation for the predetermined period of time when the difference is not less than a predetermined value.

* * * * *

UNITED STATES PATENT AND TRADEMARK OFFICE
CERTIFICATE OF CORRECTION

PATENT NO.       : 10,012,171 B2
APPLICATION NO.  : 14/915166
DATED            : July 3, 2018
INVENTOR(S)      : Shibata et al.

Page 1 of 1

It is certified that error appears in the above-identified patent and that said Letters Patent is hereby corrected as shown below:

In the Claims

In Column 23, Claim 1, Line 51, delete "engine" and insert -- engine, --, therefor.

Signed and Sealed this
Twentieth Day of November, 2018

Andrei Iancu
*Director of the United States Patent and Trademark Office*